United States Patent
Levin et al.

Patent Number: 5,500,881
Date of Patent: Mar. 19, 1996

[54] LANGUAGE SCOPING FOR MODULAR, FLEXIBLE, CONCISE, CONFIGURATION DESCRIPTIONS

[75] Inventors: Roy Levin, Palo Alto; Christine B. Hanna, Woodside, both of Calif.

[73] Assignee: Digital Equipment Corporation, Maynard, Mass.

[21] Appl. No.: 90,844

[22] Filed: Jul. 12, 1993

[51] Int. Cl.$^6$ .................................................. G06F 9/44
[52] U.S. Cl. ............................. 395/700; 364/DIG. 1
[58] Field of Search ............................................ 395/700

[56] References Cited

U.S. PATENT DOCUMENTS

| | | | |
|---|---|---|---|
| 4,517,640 | 5/1985 | Hattori et al. | 364/DIG. 1 |
| 4,558,413 | 12/1985 | Schmidt et al. | 364/DIG. 1 |
| 4,809,170 | 2/1989 | Leblang et al. | 364/DIG. 1 |
| 4,951,192 | 8/1990 | Chase, Jr. et al. | 364/DIG. 1 |
| 4,953,080 | 8/1990 | Dysart et al. | 364/DIG. 1 |
| 5,075,847 | 12/1991 | Fromme | 395/700 |
| 5,093,779 | 3/1992 | Sakurai | 395/600 |
| 5,093,916 | 3/1992 | Karp et al. | 395/700 |
| 5,115,501 | 5/1992 | Kerr | 395/600 |

OTHER PUBLICATIONS

*Structure and Interpretation of Computer Programs*, Abelson, et al., The MIT Press, Cambridge, 1985, pp. 57–61, pp. 186–191, pp. 420–484.

Primary Examiner—Thomas M. Heckler
Attorney, Agent, or Firm—Arthur W. Fisher; Gary E. Ross

[57] ABSTRACT

The problems of efficiently building a large software system are solved by the present invention of language scoping for effective configuration descriptions. A software system is defined by a tree of system models which are written in a functional language. The functional language provides a unique combination of static and dynamic scoping. This combination is required to write modular, flexible, and concise, yet complete, configuration descriptions.

16 Claims, 13 Drawing Sheets

LANGUAGE SCOPING FOR MODULAR, FLEXIBLE, CONCISE, CONFIGURATION DESCRIPTIONS

FIELD OF THE INVENTION

This invention relates generally to binding a value to a variable in a computer language, and more particularly to managing binding in a functional language used to implement a configuration management system.

BACKGROUND OF THE INVENTION

The value bound to a variable when a function employing that variable is evaluated depends upon the scoping technique employed by the computer programming language. Static scoping and dynamic scoping are two known scoping techniques.

In static scoping, a name always refers to the innermost lexically apparent assignment of a value to the name. That is, the function gets the value of the name from the environment in which the function is defined.

In contrast, in dynamic scoping a name gets its value from the environment in which the function is applied, or called.

The difference between static scoping and dynamic scoping is illustrated by the following example.

```
9       LET
10         {x = 3;
20         f = FUNCTION ... IN x + x}
25      IN
30         LET {x = 4}
40            IN f()
```

The value computed by the application of the function f at line 40 depends upon the type of scoping employed.

As a first example, in the event that static scoping is employed, the value of f( ) at line 40 is 6, because the value of the name x is taken from the environment of the function definition. In the environment of the function definition, x is bound to 3 at line 10.

As a second example, in the event that dynamic scoping is employed, the value of f( ) at line 40 is 8, because the value of x is taken from the environment in which the function application occurs. In the environment of the function application, x is bound to 4 at line 30.

When a language is used to write configuration descriptions the question of the method of scoping becomes critical. A language is used to write configuration descriptions in order to control a "build" operation. In a build operation, software modules are compiled and linked in order to produce an executable file. The software modules may be written in various languages such as C, C++, assembly language, etc., and the configuration management language is used to write a description of operations which are applied to the software modules as they are built into a single executable file. Typically, the software modules may have over a million lines of code, and there may be tens or hundreds of individual people writing various of the software modules.

There are several properties that a configuration description should have.

First, a system description should be complete. All of the information needed to control the build operation must be written down in the description. A complete description permits the build to be reproduced at a later time. A complete description also permits a user to audit the build directly from the configuration description. By reading the description, the user can discover exactly what operations were performed.

Second, the configuration should be concise. Conciseness makes it easier to create new descriptions and to read existing descriptions.

Third, the configuration description should be flexible and easy to modify. For example, it should be possible to change the version of the compiler without having to edit every subsystem in the description. In particular, it should be possible to change the version of the compiler in one place and have the change be effective over the entire description.

Fourth, each modular subsystem of the description should encapsulate essential aspects of the subsystem so that a subsystem cannot be inadvertently changed by another subsystem.

The scoping method of a configuration description language affects its ability to provide these properties. If a language employs dynamic scoping, it can provide the first, second and third of the above properties. If a language employs static scoping, it can provide the fourth of the above properties. A method of scoping which provides all four of the above properties is needed.

SUMMARY OF THE INVENTION

The problems of efficiently building a large software system are solved by the present invention of language scoping for effective configurations descriptions. A software system is defined by a tree of system models which are written in a functional language. The functional language provides a unique combination of static and dynamic scoping. This combination is required to write modular, flexible and concise, yet complete, configuration descriptions.

Briefly, a software management system provided by the invention comprises means for establishing a static scope for binding a first value to a parameter by storing the first value in a first memory location, and means for establishing a dynamic scope for binding a second value to a parameter by storing the second value in a second memory location. Assignment means, responsive to a selected parameter not being contained in a memory location listed by the static scope, binds a selected value to the selected parameter by using the dynamic scope. The invention can also employ an update means for adding the selected parameter and the selected value to the static scope by storing these in a third memory location, and adding the third memory location to the list maintained by the static scope.

Other and further aspects of the present invention will become apparent during the course of the following description and by reference to the accompanying drawings.

BRIEF DESCRIPTION OF THE DRAWINGS

Referring now to the drawings, in which like numerals represent like parts in the several views.

DETAILED DESCRIPTION

The preferred embodiment of the present invention is a configuration management system for managing and building largescale software systems. The two main components of the configuration management system that support software building are a functional language and an evaluator for the functional language.

The functional language, which is fully disclosed in Appendix A, is used to write system models. System models contain both pointers to components of a software system, and all of the building instructions for putting the components together to make the software system. System models describe a software system in terms of function applications where software tools are applied to source objects and where function applications group other function applications. As used herein, source objects refer both to components of the software system containing source code and to system models. The source objects are created by the software developers working on the software system. Every source object created in the course of developing a software system is given a human-understandable name and a unique machine-understandable name, a UID. All source objects are immutable and immortal meaning that a source object, once created, is never changed, and once named with a UID, retains that particular UID always. Changes to the software system are accomplished by creating new source objects.

A system model describes a software system completely and accurately. Every element used to produce the software system is specified. For example, among the things which the system model gives are: pointers to the source objects and the software tools, the versions of the software tools, and the hardware platforms on which the software system is to be built.

Figure 1A:
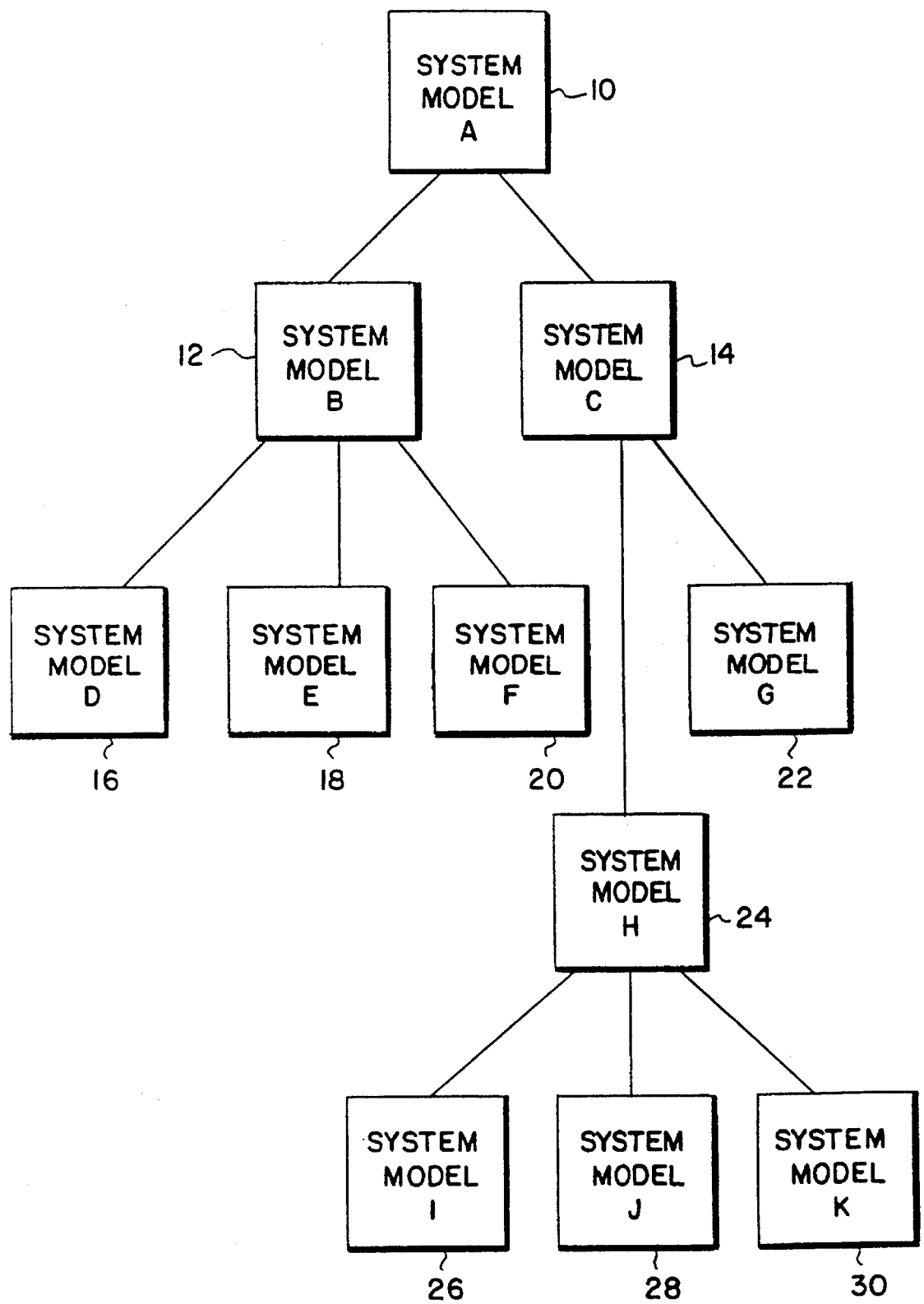
FIG. 1A is a tree of system models describing a software system.

System models may include other system models so that the software system may be described by a tree of models, as shown in FIG. 1A. The included models may also be referred to as imported models. In FIG. 1A, system model A 10 includes system model B 12 and system model C 14. System model B 12 includes system model D 16, system model E 18 and system model F 20. System model C 14 includes system model G 22 and system model H 24. System model H 24 includes system model I 26, system model J 28, and system model K 30.

Figure 1B:
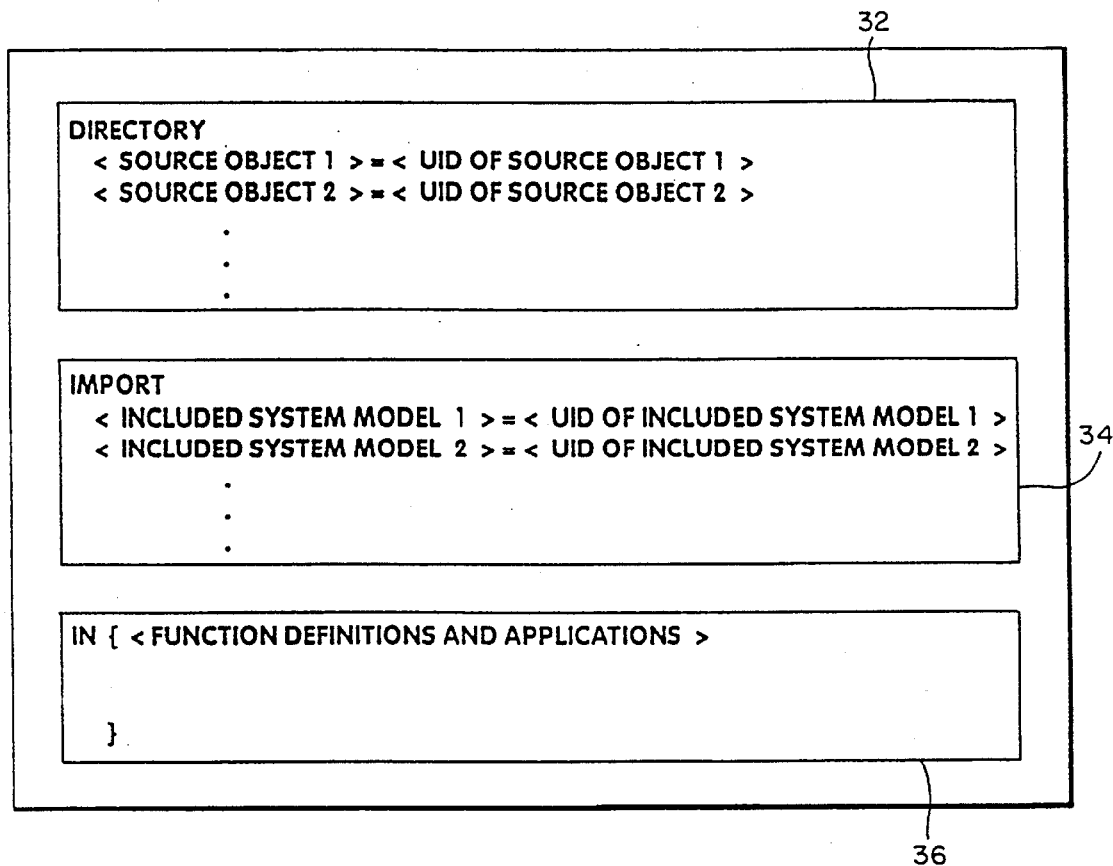
FIG. 1B is general system model.

System models have three parts as shown in FIG. 1B. The DIRECTORY clause 32 contains the source objects. The IMPORT clause 34 contains the included system models. The function clause 36, designated by "IN," contains the function definitions and applications which include all of the instructions for building the software system from the data from the DIRECTORY clause 32 and from the IMPORT clause 34.

During a "build" of the software system, the system models are interpreted, invoking compilers and linkers to produce an object code representation of the software system. The evaluator is the means by which a tree of models, written in the functional language, is evaluated. The evaluator works by evaluating the entire tree of models imported by the particular model it is working on. This evaluation include building all the components of all the models from source code. For example, if the evaluator were given system model A 10 from FIG. 1A to evaluate, all of the included system models, as described above, would be evaluated in the course of the evaluation of system model A 10.

Figure 2:
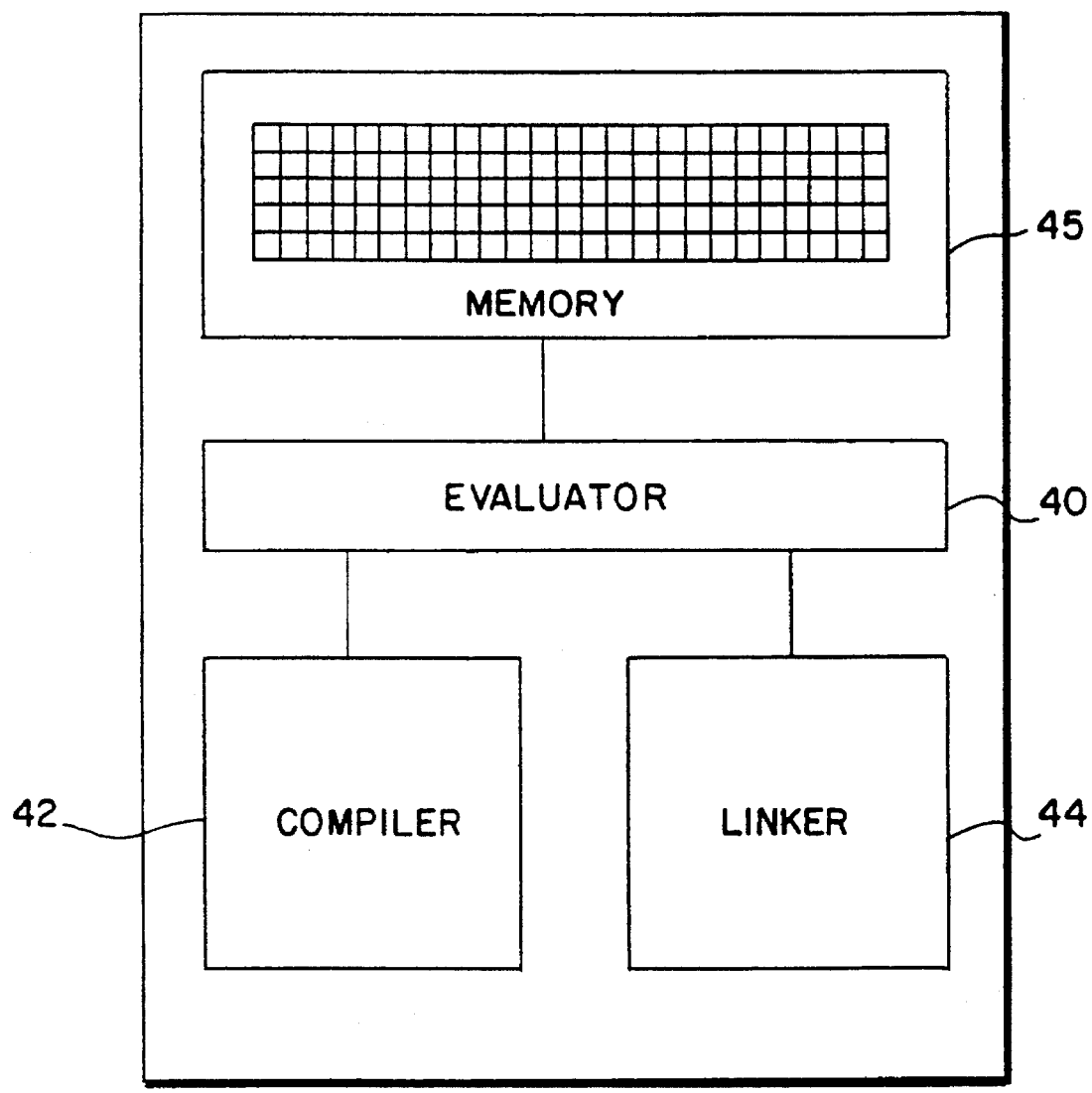
FIG. 2 shows elements of the configuration management system.

Elements of the configuration management system are shown in FIG. 2. The evaluator 40, as it evaluates a system model utilizes a compiler 42, a linker 44 and a memory device 45 to build the software system.

CACHING

If the evaluator had to evaluate every component of every model every time a large software system were built, the time needed to perform the build would be excessive. To speed up evaluation, the results of interpreting the expensive expressions in the functional language are cached. As used herein, to cache a value means to store the value in a memory device in such a way that allows the value to be retrieved quickly when it is needed.

The expensive expressions in the functional language are function applications. A function is an operation such as "compile," whose inputs are the source objects and the compile options. The result of an application of the function "compile" is an object file, also called a derived object. Functions may call other functions resulting in at least one object file for each function applied. For example, a function called "impls" may contain forty applications of the function "compile." The result of one application of "impls" is forty object files.

The evaluator caches the results of all function applications at all levels of building the software system. In the examples "compile" and "impls" given above, the evaluator would cache the results of the single application of compile in the "compile" function and the forty applications of compile in the "impls" function as well as the "impls" function itself. This multi-level caching capability is what permits the configuration management system to efficiently build and rebuild large software systems by using previously built objects.

Caching in the configuration management system is automatic and persistent, meaning that the results generated during caching are retained and are available every time a build of the software system is performed to further reduce the time required to build a large-scale software system.

Figure 3:
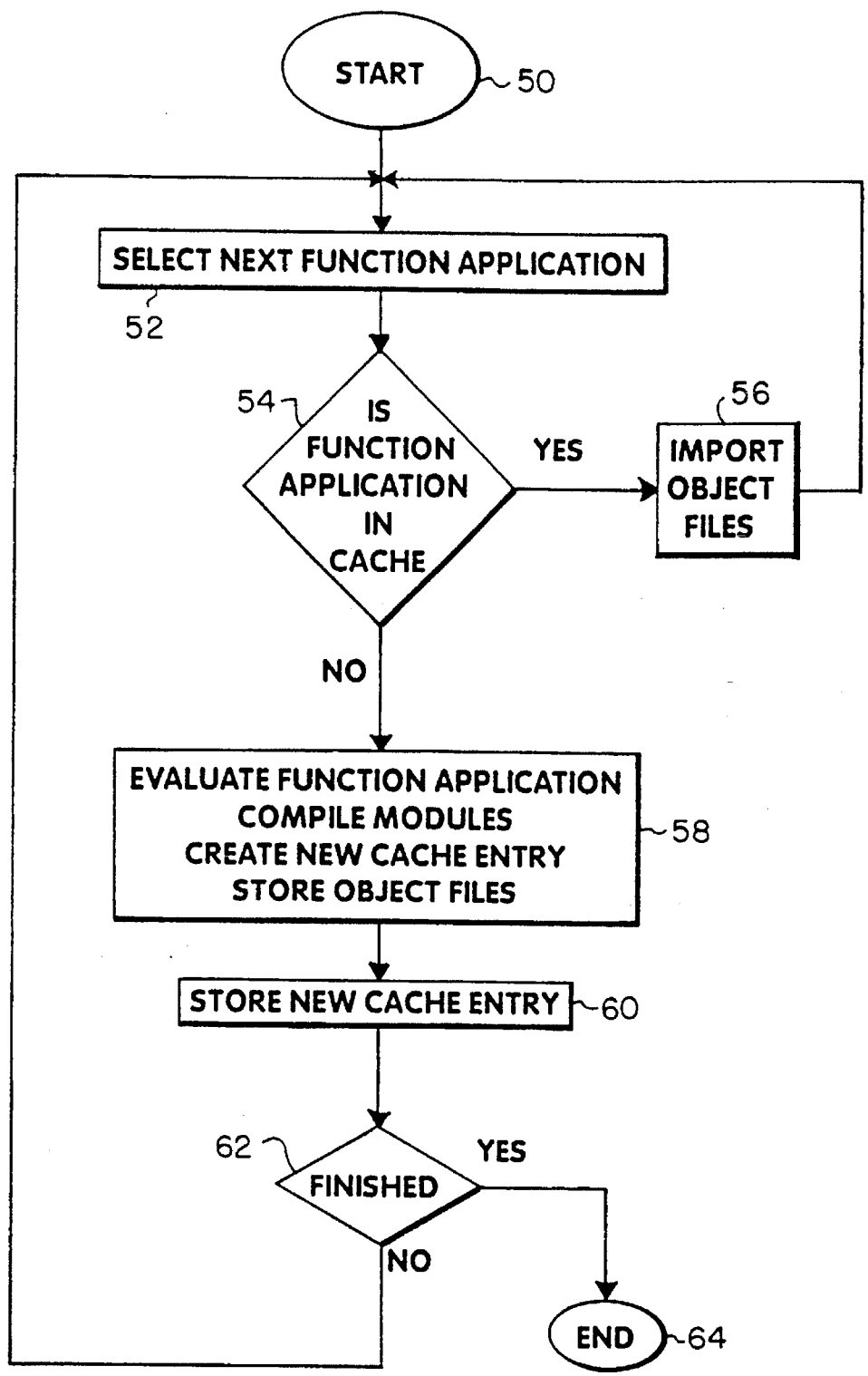
FIG. 3 is a flow chart of function evaluation.

Before evaluating a function application, the evaluator checks whether the function application has been evaluated before. The operation of evaluating a function is illustrated in FIG. 3. At the start 50 of the evaluation, the evaluator moves through a system model and selects the functions as it encounters them, block 52. The evaluator then determines, as shown in decision block 54, whether the function application is in the cache. The operation of checking for whether a function application has already been evaluated is called a cache lookup. The cache and cache lookup will be explained more fully below. If the evaluator performs a cache lookup and finds that the function application has already been evaluated, the stored value, which may be one object file or many object files, of the function application is returned to the evaluator, block 56, and the time that would have been spent re-evaluating the function application is saved. If the function application has not already been evaluated, the evaluator evaluates the function application, block 58, and stores the function application and the result in the form of a cache entry, block 60. After storing the cache entry 60, the evaluator checks for more functions to evaluate, decision block 62. If there are more functions, the evaluator goes back to block 52, and selects the next function to be evaluated. If there are no more functions, the evaluation ends, block 64.

CACHE ENTRY

Figure 4:
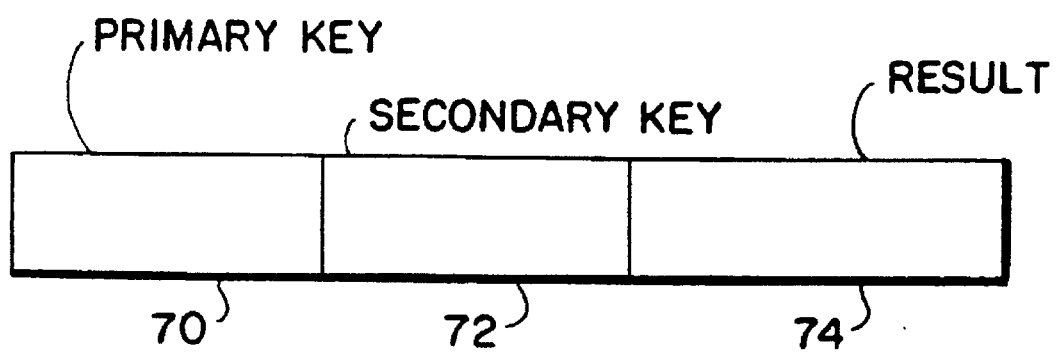
FIG. 4 is a cache entry.
Figure 5:
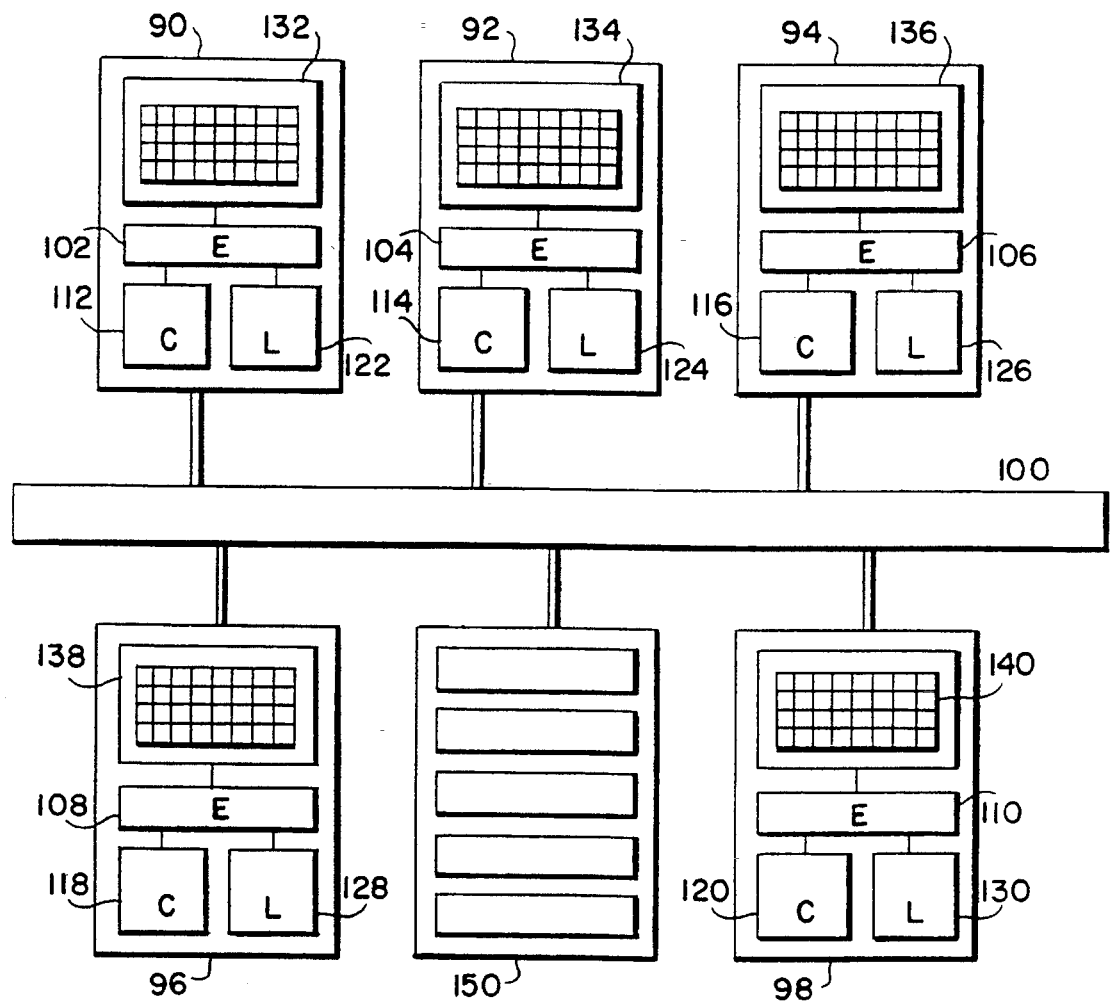
FIG. 5 is a software development environment.

A cache entry, as illustrated in FIG. 4, contains all the information needed by the evaluator to determine whether an expression has been evaluated before. Each cache entry contains three elements, a primary key 70, a secondary key 72 and a result value 74 of a function application. Cache entries for each particular software system are grouped into caches. Caches are saved in a persistent memory device, also referred to herein as the repository, so that the information is available to the evaluator across instances of builds of the software system. An example of a persistent memory device is a hard disk. Caches may be shared across a software development environment so that the various software developers working on developing a software system may have access and benefit from the work that other developers have already done. FIG. 5 shows an example of a software development environment.

In FIG. 5, a group of workstations 90, 92, 94, 96, 98 is connected through a network 100. Each workstation 90, 92, 94, 96, 98 has an evaluator 102, 104, 106, 108, 110, a compiler 112, 114, 116, 118, 120, a linker 122, 124, 126, 128, 130 and a memory device 132, 134, 136, 138, 140. Each workstation 90, 92, 94, 96, 98 has access to a persistent storage device 150 through the network 100. Caches are stored on the persistent storage device 150 and are available to all the workstations 90, 92, 94, 96 and 98.

The primary key 70 and the secondary key 72 of the cache entry are implemented for efficient storage and accurate searching of the repository. The primary and secondary keys 70, 72 are separated to facilitate search. A cache hit occurs when the evaluator encounters a function application, computes the primary and secondary keys of the function application and finds a match among the cache entries stored in the repository. A cache miss occurs when no match is found.

The primary and secondary cache keys 70, 72 are computed from values in the functional language. The language values are similar to values in other programming languages. The primitive values in the functional language are a string, a number, a Boolean, and a UID. The UID is an integer used as a machineunderstandable name for a file, e.g. a system model, a source object, or a derived object.

The functional language also contains composite values. The composite values are a binding, a list, and a closure. A binding is a set of name-value pairs. A list is a linked list which is a sequence of nodes each having at least two fields, a data field and a pointer field with a pointer to the next element of the list. A closure is a function and the environment in which the function was defined.

Composite values are evaluated only when particular components of the value are needed. The unevaluated components of composite values are known as lazy values. A lazy value is a spontaneously-created closure; that is, the lazy value is an unevaluated expression together with the environment in which the unevaluated expression could be evaluated. Use of lazy values is a known technique which is used to improve performance in the evaluation of system models. The lazy value technique improves performance because a value is computed only if it is needed.

TABLE 1

| LET {a = 5, b = 6, c = 7} IN |
|---|
| LET {comp = {x = a + b, y = b + c, z = a + c}} IN |
| comp$x + comp$y |

For example, in the above model fragment in Table 1, the "z" component of the composite value "comp" is lazy, because its value is not needed in this part of the computation. The last line in this simple example controls the output. That is, the last line uses only "x" and "y." The expression of the lazy value "comp$z" is:

a+c and the environment of this lazy value is:

{a=5, b=6, c=7}.

The environment contains all the information necessary to actually evaluate the lazy expression later in the computation, if the value of the lazy variable is required. If the value of the lazy variable is not required, the evaluator has saved time by not computing a value that is never used.

TABLE 2

| 01 | DIRECTORY |
|---|---|
| 02 | Hanoi.mod = /v/0haM08002P.Zay/S385.2.hanoi, |
| 03 | Hanoi.mss = /v/0haM08002P.Zay/S385.1.hanoi, |
| 04 | IMPORT |
| 05 | building-env.v (*/vesta/proj/building-env.22.vulcan.1*) = |
| 06 | /v/0haM08002P.Zay/M345.3ea.buildingenv, |
| 07 | IN { |
| 08 | build = FUNCTION ... IN |
| 09 | LET M2 IN { Hanoi = Prog( (Compile(Hanoi.mod), SL-ui) ) }, |
| 10 | |
| 11 | test = LET building-env.v$Env-default IN |
| 12 | build(), |
| 13 | } |

The primary key 70 of a cache entry is computed from the string made up of the definition of the function together with the values of the actual parameters of the function application. A simple system model is given in Table 2. For the function application, "Compile(Hanoi.mod)" on line 9 of Table 2, where the source objects are written in the language Modula-2 with the compiler version 3.4, the primary key would be:

```
"(FUNCTION s ... IN
    BridgeCall("Modula-2 + Compiler, version 3.4", 1))
    (/v/0haM08002P.Zay/S385.2.hanoi)."
```

The term "BridgeCall" invokes a tool such as the compiler or the linker. The UID of the source object is used in the primary key. In this case, the UID of "hanoi.mod" is "/v/0haM08002P.Zay/S385.2.hanoi." The type of compiler and the version of the compiler is contained in compile command on line 9 of Table 2 which includes the terms "M2" and "Prog" as well as the term "Compile."

The primary cache key 70 is used to find a set of potentially matching cache entries during a search. When the evaluator comes upon a function application during an evaluation, the evaluator computes the primary cache key 70 and searches the repository for cache entries with matching primary keys.

The primary cache key 70 is chosen to narrow down the choices of potential cache entries quickly. The primary cache key 70 contains the function definition and the arguments because the function alone would produce too many potential cache entries. For example, a system model may contain many applications of the compile function, but there would typically be few instances of applications of the compile function with the same actual parameters.

TABLE 3

```
DIRECTORY
    AVax.def = /v/0haM08002P.Zay/S851.6.plat,
    AAlpha.def = /v/0haM08002P.Zay/S851.5.plat,
IN {
    intfs = FUNCTION target ... IN
    IF eq(target, "VAX") THEN
        M2$Compile(AVax.def)
    ELSE IF eq(target, "ALPHA") THEN
        M2$Compile(AAlpha.def)
    ELSE
        error("target value is incorrect")
    END
}
```

The primary cache key 70 is chosen to minimize unnecessary cache misses. Therefore, in computing the primary cache key, only the function and the actual parameters are used. An unnecessary cache miss may occur when a key contains superfluous information that is not used when computing the result of the function. If only the superfluous information in the key is different, then a cache miss will occur even though a cache hit would have been otherwise correct. For example, superfluous information which might cause a cache miss is the environment of the function. The environment of the function may contain information which is not used in the application of the function. In the system model in Table 3, the environment of the function "intfs" contains both "AVax.def" and "AAlpha.def," but only one of these names would be used by an application of the function "intfs" during an evaluation of the system model.

The secondary cache key 72 is a list of names and corresponding values determined from the free variables in the body of a function. A free variable in a function is a name referenced in the function that is not defined in the body of the function and is not one of the actual parameters of the function.

TABLE 4

```
FUNCTION M2 ... IN {
    M2$Compile(A.def),
    M2$Compile(B.def)
}
```

In the function in Table 4, the explicit free variables of the function are A.def and B.def. When the function is applied, many more implicit free variables may be discovered in the calls to M2$ Compile. A free variable for a function application may be accessed within the body of that function or it may be accessed within the body of a function called within the original function application.

Two different applications of the same function may have different free variables. For example, in Table 3, the set of free variables would include "AVax.def" if the function application were intfs("VAX"). However, if the function application were intfs("Alpha"), the set of free variables would include "AAlpha.def" instead.

As shown above, the free variables of a particular function application are discovered as the function application is evaluated. As each new free variable is discovered, the evaluator adds an entry to the secondary cache key. Each entry is a namevalue pair containing a free variable name and its value.

TABLE 5

```
Bitmap.d: /v/0haM08002P.Zay/D0.aa823462.bitmap,
ChassisVBT.d: /v/0haM08002P.Zay/D0.972cd521.vbt,
InertVBT.d: /v/0haM08002P.Zay/D0.1182afff.vbt,
Point.d: /v/0haM08002P.Zay/D0.5281928a.point,
M2-compile-options:
    {Profiling = FALSE,
    Checking = TRUE,
    Incremental = TRUE,
    Optimization = 0 }.
```

Using the system model from Table 2, the list of names and corresponding values which make up the secondary cache key of the function application "Compile(Hanoi.mod)," is shown above in Table 5. The names "Bitmap.d," "ChassisVBT.d," "InertVBT.d," "Point.d" and "M2-compile-options" do not appear directly in the sample of code in the Vesta language given in Table 2. The names and their values are included in the result of the expression "building-env.v$Env-default" on line 11 of Table 2. The expression "building-env.v$Env-default" contains the information about the environment of the function.

Figure 6:
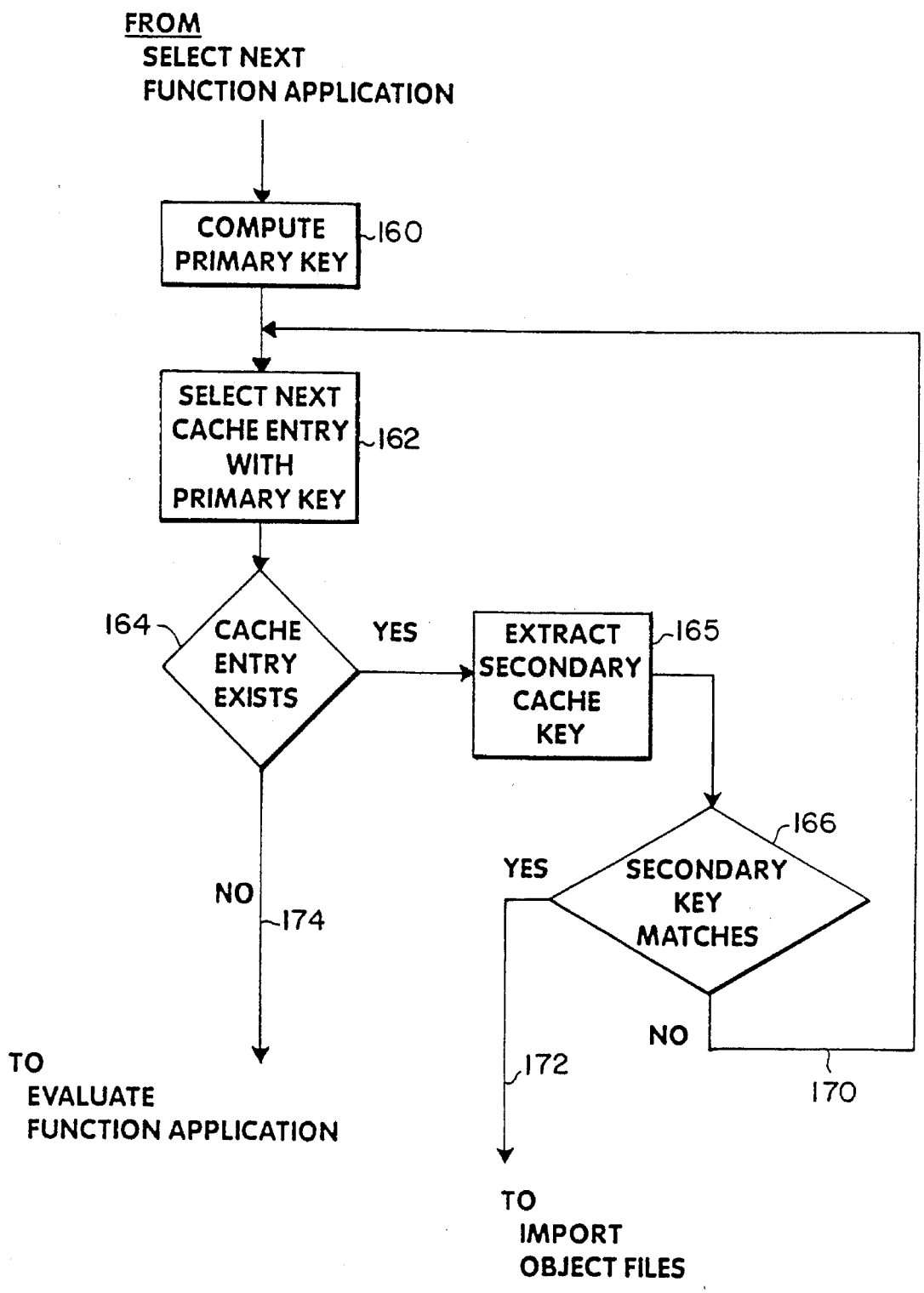
FIG. 6 is a flow chart of a caching decision.

The primary and secondary cache keys 70, 72 are separated in order to facilitate cache lookup. When the evaluator performs a cache lookup, as shown in FIG. 6, it first computes the primary key of the function application, block 160. The caches are searched for all cache entries with a matching primary key, block 162. If no match is found, decision block 164, the function application is evaluated. If a primary key match is found, the secondary key is investigated, block 166. If the secondary key matches that of the function application, the object files are retrieved and the function application does not have to be evaluated. If the secondary key does not match, the next cache entry with a matching primary key is selected, block 162.

FINGERPRINTING

The values of the primary and secondary cache keys, as described above, are typically very large. In order to reduce the size of the keys, a hashing technique called fingerprinting is employed. Fingerprints provide small, fixed-sized identifiers for values. Substituting fingerprints for the lengthy values of the cache keys makes the cache entries much smaller and saves space in the cache. Fingerprint comparisons are typically faster than comparisons of the long values of the keys unless the key values are short. With the hashing technique of fingerprinting, the probability of an incorrect cache hit is very small.

An exemplary fingerprinting scheme for strings, which may be found in "Some Applications of Rabin's Fingerprinting Method," *Sequences II Methods in Communication, Security, and Computer Science,* 1993, Springer-Verlag, by Andrei Z. Broder, ed. by Capocelli, et al., can generally be described by the following algorithm, $$f(A)=A(t) \bmod P(t)$$

where

A is a string to be fingerprinted and may also be considered as the polynomial A(t), A(t) is the polynomial, $A(t)=a_1 t^{m-1}+a_2 t^{m-2}+\ldots+a_m$, of degree (m-1) with coefficients in the field {0,1}, and P(t) is an irreducible polynomial of degree k over the field {0,1}. In an exemplary implementation of the invention, the irreducible polynomial, which was arbitrarily chosen, is $$P(t) = 1 + t + t^2 + t^3 + t^4 + t^6 + t^9 + t^{10} + t^{11} + t^{12} + t^{13} +$$
$$t^{15} + t^{19} + t^{20} + t^{21} + t^{23} + t^{30} + t^{31} + t^{32} + t^{33} + t^{34} + t^{35} +$$
$$t^{36} + t^{38} + t^{39} + t^{41} + t^{42} + t^{44} + t^{46} + t^{47} + t^{48} + t^{50} + t^{51} +$$
$$t^{57} + t^{59} + t^{60} + t^{62} + t^{65} + t^{66} + t^{67} + t^{68} + t^{69} + t^{70} + t^{74} +$$
$$t^{75} + t^{77} + t^{78} + t^{79} + t^{80} + t^{81} + t^{83} + t^{84} + t^{86} + t^{87} + t^{91} +$$
$$t^{92} + t^{96}.$$

Since the input strings are unbounded in size, more than one string may map into the same fingerprint, an event which is referred to as a collision. However, the probability of collision is low. The general rule is that the probability of collisions grows quadratically with the number of strings compared and linearly with the lengths of strings compared. The probability of collision here is estimated to be $$n^2 * m/2^{95},$$

where n is the number of strings considered, and m is the average length of the strings considered.

So, for the application of fingerprinting in the present invention, fingerprints are presumed to be unique.

The fingerprint of the concatenation of two strings can be computed via the equality $$f(\text{concat}(A, B))=f(\text{concat}(f(A), f(B))).$$

Therefore, fingerprints of strings may be built up piece by piece as the parts of a string are determined by the evaluator.

In the exemplary embodiment of the invention, both the primary and secondary cache keys are inputted to a fingerprinting function which returns a 96 bit value.

In fingerprinting, the value and the data type of the value are fingerprinted separately and then combined to form a single fingerprint. This is possible because of the composition property of strings described above.

Different values are handled by the fingerprinting function in different ways. In the case where a value is a string, the value is passed into the fingerprinting function without any prior operations. In the case of a Boolean value, the string "TRUE" or the string "FALSE" is given to the fingerprinting function. Numbers are converted to string representation and then passed in to the fingerprinting function. A UID is handled like a number. In the case of a list, each element is fingerprinted and the fingerprints are combined to form a single fingerprint for the entire list. In the case of a binding, the fingerprints of each of the name-value pairs are combined to form a single fingerprint. A pair is fingerprinted by taking the fingerprint of the name and combining it with the fingerprint of its value. In the case of a closure, the string representing the function is fingerprinted and then combined with the fingerprint of the environment, which is represented and fingerprinted as a binding.

In fingerprinting the primary cache key, the string determined from the function definition and the values of the actual parameters is passed into the fingerprinting function. Returning to the example of the primary cache key of "Compile(Hanoi.mod)" from Table 2, the string "(FUNCTION s . . . IN BridgeCall("Modula-2 + Compiler, version 3.4", 1))
(/v/0haM08002P.Zay/S385.2hanoi)"

would be returned from the exemplary fingerprinting function as the fingerprint: 82365121.

The secondary cache key is a list of items, each item having two parts, a name and the fingerprint of its value. Returning to the example of the secondary cache key of "Compile(Hanoi.mod)" from Table 2 and employing the exemplary fingerprinting function, the value of Bitmap.d would be represented by the fingerprint: aa823462; the value of ChassisVBT.d would be represented by the fingerprint: 972cd521; the value of InertVBT.d would be represented by the fingerprint: 1182afff; the value of Point.d would be represented by the fingerprint: 5281928a; and the value of M2-compile-options would be represented by the fingerprint: 900ab356.

SPECIAL CASES

Some values that appear in a cache entry require special treatment. The special cases are: an error in the result value, a lazy value in the result value, a lazy value in the secondary key, a closure in the result value, a UID in the secondary cache key, and a UID in the primary key.

A cache entry is not created for any function application where an error is produced during interpretation. This rule applies recursively to function applications that call the function application with the error. A cache entry is not created in these cases because the function evaluation may fail due to a transient system problem. For example, the temporary file space available to compilers is limited, and an application of "compile" may fail because of inadequate temporary space. Caching this failure result would be a mistake because the application may succeed when adequate disk space is subsequently available.

A cache entry is not created for any function application where the result of the function application contains a lazy value. After a system model is completely evaluated, some unevaluated, or unlazied, lazy values which may have been produced during evaluation may still be present. During the evaluation of a system model, unevaluated lazy values may appear in free values that are of the type list, binding or closure. These lazy values were not needed to compute the result value of the system model but consequently appear as the result value of some cache entry. An example which may be used to illustrate lazy 10 values is the system model shown in Table 6.

TABLE 6

```
libs = FUNCTION . . . IN {
    filelib = file.v$lib();
    memorylib = memory.v$lib()};
build = FUNCTION . . . IN
    LET M2 IN {
        log = Prog((Compile(Log.mod),libs()$filelib,SL-basics))};
test =
    LET building-env.v$default() IN build();
```

After test is evaluated, cache entries for the different function applications will be produced. The result of evaluating the function application libs( ) will be a binding. The memorylib component of libs( ), which was never used during evaluation, will produce a lazy value. So, libs( ), after evaluation, is a binding that contains a lazy value. Because a lazy value is represented as an unevaluated expression together with the current environment at the time the lazy value was created, a lazy value is typically too large to economically save in a cache.

In the exemplary implementation, creation of a cache entry having a lazy value in the secondary cache key is avoided. A lazy value in the secondary cache key makes getting a cache hit very unlikely. The exemplary implementation evaluates the top-level components of composite values, but leaves other lazy values, nested inside the top-level components, unevaluated.

A closure in the result value poses special problems in creating a cache entry. A closure is composed of a function and its environment at the point of definition. The environment may contain values that are lazy. Before the cache entry is created, the lazy values in the environment must be completely evaluated because the typically large lazy values would take up too much space in the cache. Typically, a lazy value may be several hundred lines of code.

There is one exception to simplifying all the lazy values in the environment. If the lazy value is produced from the evaluation of a model, then the value is not simplified but is converted into the model's UID. This method is necessary because completely simplifying a model may require a great deal of extra evaluation.

A system model is a source object named by a UID, and one system model may import others. When a model is evaluated, it produces a value. The value can be a string, a number, a Boolean, a UID, a binding, a list or a closure. There are two possible representations for the model value: its UID or the value that results from evaluating the model. To avoid the inefficiency of caching a value when a system model is in the secondary key, the implementation uses the UID representation for the model value.

Generally, one cache entry is created for every function that is evaluated. However, in one special case, two cache entries with different primary keys are constructed for one function. When the evaluator interprets an application with the syntactic form:

Model$Name(Args)

it creates two cache entries. "Model" in this expression is the UID of a particular system model. When a system model appears in the syntactic form, Model$Name(Args), the system model must evaluate to a binding, and "Name" refers to a particular component of the binding. In this special case, the component is a function where "Args" are the actual parameters of the function.

The first cache entry created for "Model$Name(Args)" is a regular cache entry. The second is a special-key cache entry. The primary cache key of the special-key cache entry is computed from the UID of "Model," the name of "Name," and the value of "Args." As explained above, a model may remain unevaluated and may be represented for caching purposes by its UID. Consequently, to get a cache hit on the special-key cache entry, where "Model" is represented by its UID, the value of "Model" does not have to be evaluated, which reduces the time needed to get a cache hit. A cache lookup on a special-key cache entry is less expensive than on a regular cache entry, but the special-key lookup may fail where the regular lookup will succeed. The case may be that the value of "Model" may not match with any value already cached while the value of "Model$Name" does match a cache entry in a cache. With the special-key lookup, the value of "Model" must match; with the regular lookup, only the value of "Model$Name" must match. During cache lookup the evaluator attempts a cache hit on the special-key cache entry first; if that lookup fails it then tries to get a hit on the regular cache entry.

SYSTEM OPERATION

In operation, the evaluator evaluates a tree of system models and looks at each function application to see whether it has been evaluated before. Turning now to FIG. 6, the primary key to the function application is computed and fingerprinted at block 160. The evaluator then looks for matching primary keys among the cache entries stored in the cache at blocks 162, 164. If a set of cache entries with matching primary keys is found, the evaluator takes each cache entry in turn at blocks 162, 164. The evaluator extracts the secondary cache key from each successive entry at block 165. The evaluator looks up each of the names contained in the secondary cache key in the environment of the function it is interpreting. If a name is undefined, the evaluator fails to find a match and determines a cache miss at block 166. If the name is defined in the environment, the fingerprint associated with the name is compared to the fingerprint of the value in the environment at block 166. If the evaluator fails to find a match in the values, it determines a cache miss and takes path 170. If each of the names and fingerprinted values in the secondary key is matched in the function and environment, a cache hit occurs and the evaluator takes path 172. If a matching secondary key is found, the function application has a match and has therefore been evaluated before. The value stored in the cache entry is returned from path 172 to the evaluator, the time which would otherwise have been spent reevaluating the function is saved, and the evaluation of the system models continues. If no match is found, the function application is evaluated, along path 174, and the result is stored in the cache as a cache entry at block 60 of FIG. 3 before the evaluation of the system model continues.

STATIC AND DYNAMIC SCOPING

In a programming system, a scope, also called an environment, is a device for storing names and associated values in memory 45, and for making names and values available as needed by the program. A scope may be implemented in a number of ways, for example, as a hash table, as an array or as an ordered list. In the exemplary embodiment of the invention, the scope is an ordered list of name-value pairs. Whenever a name is assigned a new value during the processing of a program, a new entry is made at the front of the scope list. When a name is looked up in the scope, the list is searched from the front. The search is terminated and the value is returned to the program when a matching name is found. If the name is not found, the name is said to be undefined.

TABLE 7

| 10 | { x = 10; |
| 12 | y = "abc"; |
| 14 | z = TRUE } |

Table 7 shows a fragment of a system model. The scope after the execution of line 10 is scope: [ x=10].

That is, there is a single entry in the scope list in which the name "x" has the value "10." The scope after the execution of line 12 is scope: [y="abc", x=10].

That is, a new entry is made in which the name "y" has the value "abc". The scope after the execution of line 14 is scope: [z=TRUE, y="abc", x=10].

That is, a new entry is made in which the name "z" has the value "TRUE".

In some programming systems, which use the exemplary functional language used to write system models, two types of scopes are maintained: the static scope and the dynamic scope. The static scope arises from the lexical structure of a program. The dynamic scope arises from the run-time sequence of function calls. In the definition of a function, the static and dynamic scopes interact. The static scope of a function contains the names and values which were defined at the point where the function was defined. The dynamic scope of a function contains the names and values defined at the point where the function was applied, i.e., called. Both the static and dynamic scopes are employed in processing the function.

During the execution of the program, each name must be replaced by a value. This replacement is called binding the name. The value is determined by looking the name up in a scope, and the value will depend upon whether the static or dynamic scope is used. Binding a name to a value from the static scope is called lexical, or static, scoping. Binding a name to a value from the dynamic scope is called dynamic scoping.

With static scoping, a name always refers to the innermost lexically apparent assignment of a value to a name.

TABLE 8

| 10 | LET |
| 20 | { f = FUNCTION ... IN |
| 22 | LET {x = 3} IN |
| 24 | x + x } |
| 25 | IN |
| 30 | LET {x = 4} |
| 40 | IN f() |

Using static scoping, the result of evaluating f( ) on line 40 of Table 8 is 6. The body of f defines a scope containing the assignment of the value 3 to the name x, and the binding of both occurrences of the name x on line 24 by static scoping returns the value 6.

TABLE 9

| 9 | LET |
| 10 | {x = 3; |
| 20 | f = FUNCTION ... IN x + x} |

TABLE 9-continued

| 25 | IN |
| 30 | LET {x = 4} |
| 40 | IN f() |

In Table 9, the assignment on line 10 of the value 3 to the name x occurs outside the body of the function f, but, with respect to the body of f, it is still the innermost lexically apparent assignment to the name x. Therefore, using static scoping, it is this assignment that is used to bind the two occurrences of the name x in the function body, and the result of evaluating f( ) on line 40 of Table 9 is again 6.

Using dynamic scoping, a name gets its value from the scope where the function is applied, or called, not from the scope where the function was defined. Using dynamic scoping, the result of evaluating f( ) on line 40 of Table 9 is 8. The dynamic scope of f when called from line 40 includes the assignment of the value 4 to the name x that occurs on line 30 resulting in the value of 8.

Figure 7A:
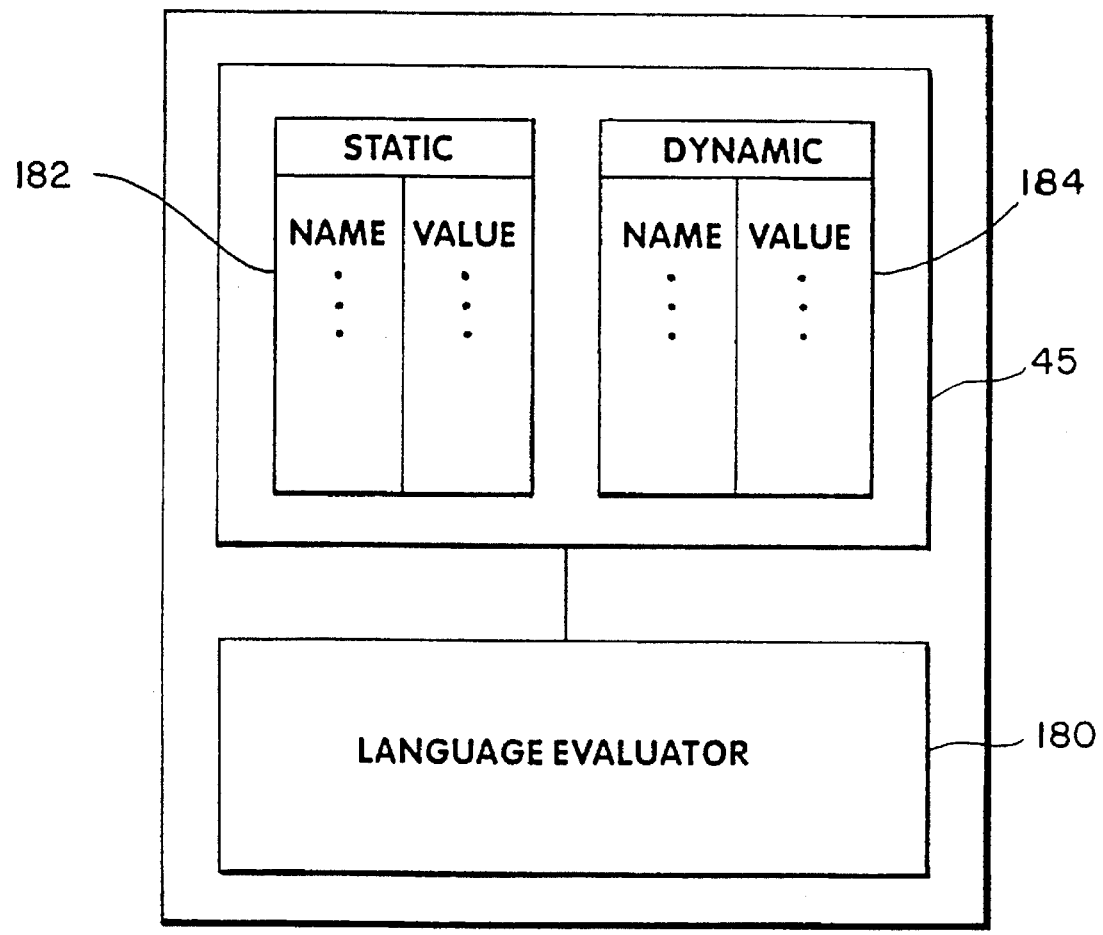
FIG. 7A shows elements of the configuration management system.

The functional language used to express system models employs both static and dynamic scoping, with static scoping taking precedence over dynamic scoping. This means that, during evaluation, each name in a function body is first looked up in the static scope. If the name is undefined in the static scope, the search is continued in the dynamic scope. As shown in FIG. 7A, the functional language evaluator 180 maintains a static scope 182 and a dynamic scope 184. The static scope 182 and dynamic scope 184 are lists of name-value pairs maintained by the evaluator 180.

The fragment of code in Table 9 may be used to demonstrate the creation of the static and dynamic scopes. When evaluating the expression on line 10, x=3 the static and dynamic scopes are empty:

| static: | [] |
| dynamic: | []. |

After the expression is evaluated, the value of x is added to the static scope, and the static and dynamic scopes are as follows:

| static: | [x= 3] |
| dynamic: | []. |

The expression of Table 9, line 20, f=FUNCTION ... IN x+x is a function definition. After evaluating the expression of line 20, the value of the function f is added to the static scope, and the static and dynamic scopes are as follows:

| static: | [f = closure([x = 3], FUNCTION ... IN x + x), x = 3] |
| dynamic: | []. |

The value of a function is a closure, which is a value that contains two components, the static scope at the point of the function definition and the function definition itself. Hence, the closure value of the function f contains "x=3" which is the static scope, and "FUNCTION ... IN x+x" which is the function definition.

After evaluating the expression of Table 9, line 30, x=4, a new value of x is added to the static scope. The static and dynamic scopes after evaluating line 30 are as follows:

```
static:    [x = 4, f = closure([x = 3], FUNCTION ... IN x + x,
           x = 3]
dynamic:   [].
```

Looking up the name x in the static scope now yields 4 rather than 3. However, the value of x inside the closure is unaffected by the change in the static scope, since the static scope inside the closure is recorded at the point in the program where the function f was defined.

The expression of Table 9, line 40, x=f( )

is a function application. The evaluation of a function application involves change to both the static and dynamic scopes. According to the rules of the functional language, evaluation of a function application requires the current dynamic scope to be replaced by a concatenation of the dynamic scope and the current static scope and the current static scope to be replaced by the closure scope, that is, the static scope at the point of the function definition. The function body is evaluated using these new scopes, giving precedence to the static scope. According to the above rules, the static and dynamic scopes during the evaluation of the expression f( ) on line 40 are as follows:

```
static:     [x = 3]
dynamic:    [x = 4, f = closure([x = 3], FUNCTION ... IN
            x + x), x = 3].
```

The static scope at the time of the function application becomes the dynamic scope and the static scope at the time of function definition, that is, the closure environment x=3 becomes the current static scope for the function evaluation.

Figure 7B:
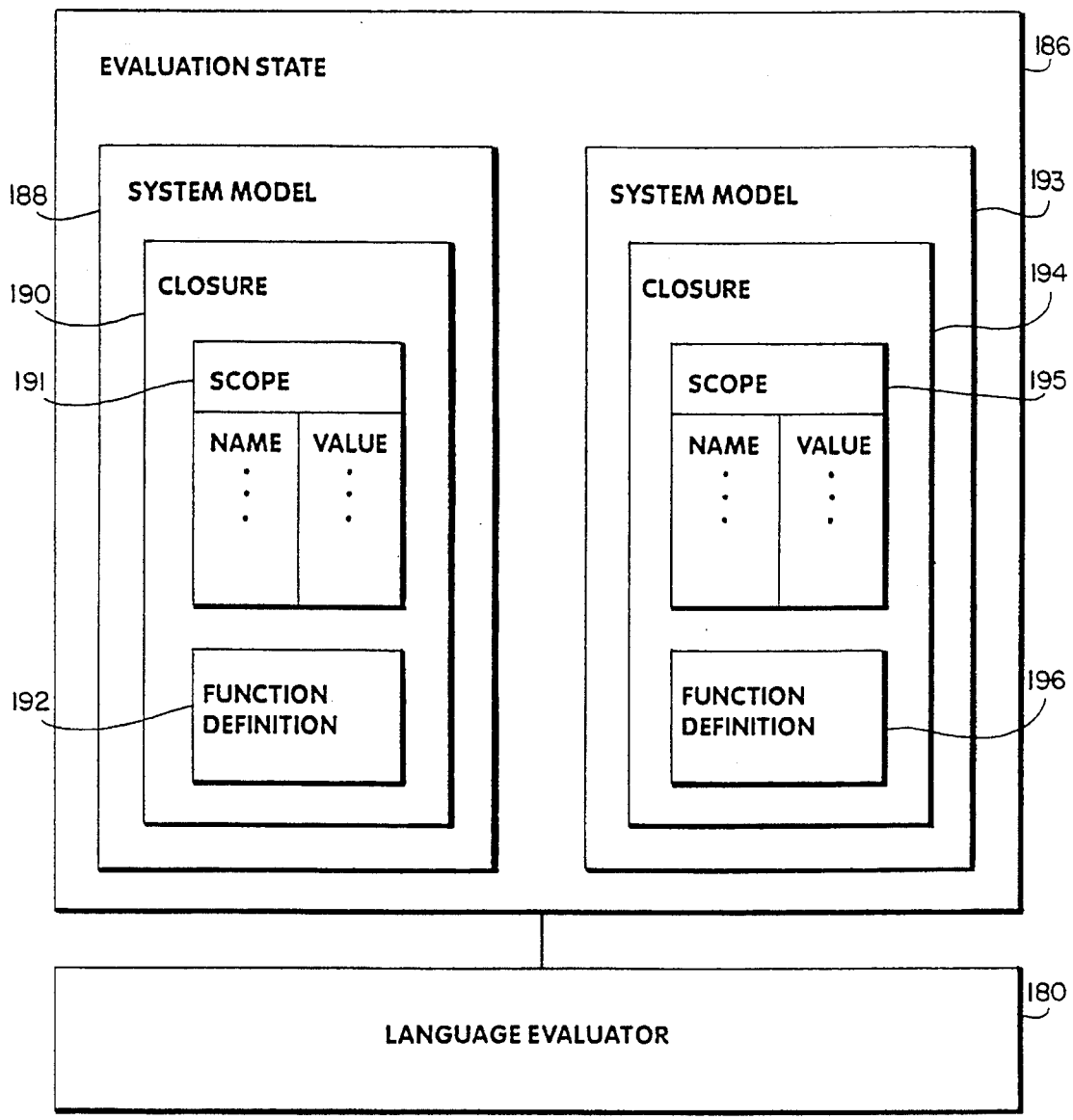
FIG. 7B shows elements of software system evaluation.

In FIG. 7B, an evaluation state 186 of the language evaluator 180 contains a first system model 188 which has a closure 190, containing a scope 191, and a function definition 192, and a second system model 193 which has a closure 194, containing a scope 195, and a function definition 196. If, for example, the function body 192 in the first system model 188 called the function 196 of the second system model 193, scope 191 of the closure 190 of the function 192 in the first system model 188 becomes the current dynamic scope. The scope 195 of the closure 194 of the function 196 in the second system model 193 becomes the current static scope. The function body 196 of the second system model 193 is then evaluated using the new scopes.

SCOPING AND SYSTEM CONFIGURATION DESCRIPTIONS

The exemplary functional language used to write system configuration descriptions, also called system models, differs from other functional languages proposed for this purpose in its unique combination of static and dynamic scoping. The unique attributes of the functional language are required to write modular, flexible, concise and complete configuration descriptions.

When one system model imports another, as in FIGS. 1A and 1B, essential aspects of each must be encapsulated so that they cannot be inadvertently changed by evaluation of the other. To do this, a user packages the essential source files of a system component in a system model by listing them in its DIRECTORY. The user also writes and includes in the system model a function that builds the component from those source files using an externally-provided environment. This modular separation of the component and the construction environment is enabled by the combination of static and dynamic scoping in the functional language. Static scoping is used to access the source files from the function body, and because static scoping takes precedence over dynamic scoping, it encapsulates this access so that the construction environment cannot interfere with it.

TABLE 10

```
01 DIRECTORY
02      Hanoi.mod       = /v/0haM08002P.Zay/S385.2.hanoi,
03      HanoiLib.mod    = /v/0haM08002P.Zay/S385.8.hanoi,
04      HanoiLib.def    = /v/0haM08002P.Zay/S385.3.hanoi,
05 IN {
06      build = FUNCTION ... IN
07          LET {M2; Compile(HanoiLib.def)} IN
08              {Hanoi = Prog(
09                  Compile(HanoiLib.mod),
10                  Compile(Hanoi.mod),
11                  SL-ui) }
12      }
```

Table 10 shows a system model for such a component. The function build, defined on lines 6–11, has three entries in its static scope. The names in the entries are Hanoi.mod, HanoiLib.mod, and HanoiLib.def. These are the only names in the static scope, so, by the scoping rules of the functional language, all other names in the body of the build function must be defined in the dynamic scope that exists when the function is applied.

TABLE 11

```
01 DIRECTORY
02 IMPORT
03      building-env.v     = /v/0haM08002P.Zay/M345.3ea.buildingenv,
04      bitmapeditor.v     = /v/0haM08002P.Zay/M90.4a.bitmapeditor,
05      copy.v             = /v/0haM08002P.Zay/M6a8.9.copy,
06      hanoi.v            = /v/0haM08002P.Zay/M385.22.hanoi,
07      ....
08 IN   {
09      LET  building-env.v$Env-default IN {
10              bitmapeditor.v$build(),
11              copy.v$build(),
12              hanoi.v$build(),
13              .....
14          }
15      }
```

Table 11 shows a system model that imports the one in Table 10. The importation occurs on line 6 of Table 11, and the build function defined on lines 6–11 of Table 10 is applied on line 12 of Table 11. Other components, defined in similar modular fashion, are constructed analogously by the function applications on lines 10 and 11.

The construction environment needed by the build function of Table 10, and by the analogous functions in the components imported on lines 4 and 5 of Table 11, is defined on line 9 of Table 11. It assigns values to all the names mentioned in the build function but not defined by its static scope. These names include M2 and SL-ui, which are the Modula-2+ construction tools and run-time library, respectively. Thus, the system model in Table 11 establishes the necessary construction environment for all of the imported components.

Because dynamic scoping is used by all the build functions to access the Modula-2+ construction tools, that is, the compiler and the linker, it is a simple matter to introduce a new version of these tools. It suffices to change the environment definition on line 9 of Table 11. The functional language's scoping rules then make that new environment definition available through dynamic scoping to all the build functions without the need to modify the bodies of the functions or the system models in which the functions are defined. This gives great flexibility to the person building the larger system containing these components, since the change of tools can be performed by a modification in a single system model and the effect is propagated systematically and consistently everywhere it is needed.

Flexibility in construction is maximized when most of the names used in a build function are bound in the dynamic scope. The build function of Table 10 is typical. Only the source files that are the essential constituents of the system component are bound in the static scope of the build function. The build function is also typical in that it depends on many names in the dynamic scope, even through they are not visible in the text of the system model. This is because the functional language permits most of these names to be omitted and treated as implicit parameters, which is another use of dynamic scoping. Implicit parameterization is a feature of the language that is unique. Other functional languages for configuration management require that the formal parameters of a function be explicitly listed in the definition. However, such a requirement prevents the system description from being both complete and concise. One property or the other is sacrificed.

To make system models concise, implicit parameterization allows the omission of formal parameters from the function definition and the further omission of the corresponding actual parameters from the function application.

TABLE 12

| 10 | LET | |
| 12 | | {f = FUNCTION x,y   IN   x + y} |
| 14 | IN | |
| 16 | | LET {x = 3, y = 7} |
| 18 | | IN f(x,y) |

TABLE 13

| 10 | LET | |
| 12 | | {f = FUNCTION ... IN x + y} |
| 14 | IN | |
| 16 | | LET {x = 3, y = 7} |
| 18 | | IN f() |

Table 12 shows a function definition and application with explicit parameters. On line 12, the function f is defined with two formal parameters x and y. On line 16, values are assigned to the names x and y, which are then used as actual parameters in the application of f on line 18.

By contrast, Table 13 shows an equivalent definition and application using implicit parameters. On line 12, the token "..." indicates that parameters have been intentionally omitted, that is, they are implicit. When the expression f( ) on line 18 is evaluated, the language's scope rules are used to bind the names x and y on line 12. Since the static scope of the function f is empty, x and y are bound in the dynamic scope, that is, using the definition on line 16.

The examples in Tables 12 and 13 are equivalent, but the example in Table 13 is more concise. In a substantial software system, the difference in the size of the two descriptions is much greater, since the functions in the system models for large systems typically have dozens of parameters. Implicit parameterization enables long lists of actual and formal parameters to be omitted from the system description without sacrificing semantic completeness.

It is understood that the above-described embodiments are simply illustrative of the principles of the invention. Various other modifications and changes may be made by those skilled in the art which will embody the principles of the invention and fall within the spirit and scope thereof.

APPENDIX A. THE VESTA SYSTEM

An example of a functional language used in software configuration management is the Vesta language. The Vesta language is part of a configuration management system which includes an evaluator and a repository.

The Vesta configuration management and software building system is aimed at simplifying large-scale programming—the construction and evolution of large software systems. Vesta attacks some of the difficulties encountered in the development of large systems: control of parallel development and testing; portability and cross-platform development; and inter-component consistency control. Vesta accommodates small and large programs, single- and multi-person projects. It is useful both during routine development and when making sweeping changes to a system.

The current Vesta system includes an object repository, a system modelling language, a language evaluator, and a number of bridges. The repository stores objects and gives them user-sensible names. The system modelling language is used to write system models (or models, for short) that describe how the components fit together to form a resulting software system. The language evaluator processes the models to build software systems. Each bridge is an intermediary between the evaluator and an individual compiler or tool. Vesta is extensible and bridges are the way Vesta is integrated with existing preprocessors, compilers, linkers, etc.

Figure 8:
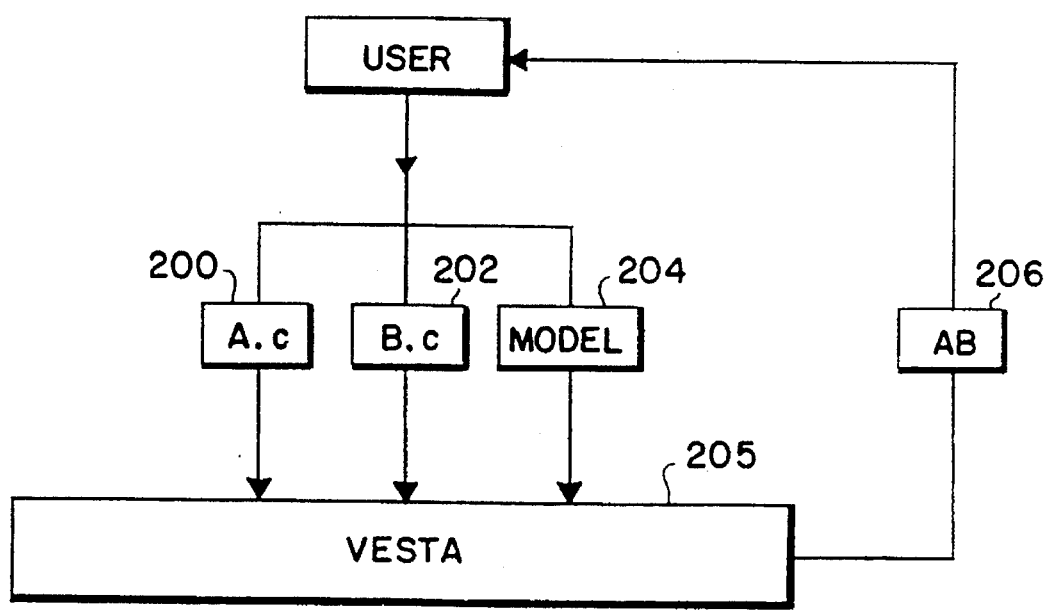
FIG. 8 is a model of user interaction with Vesta.
Figure 9:
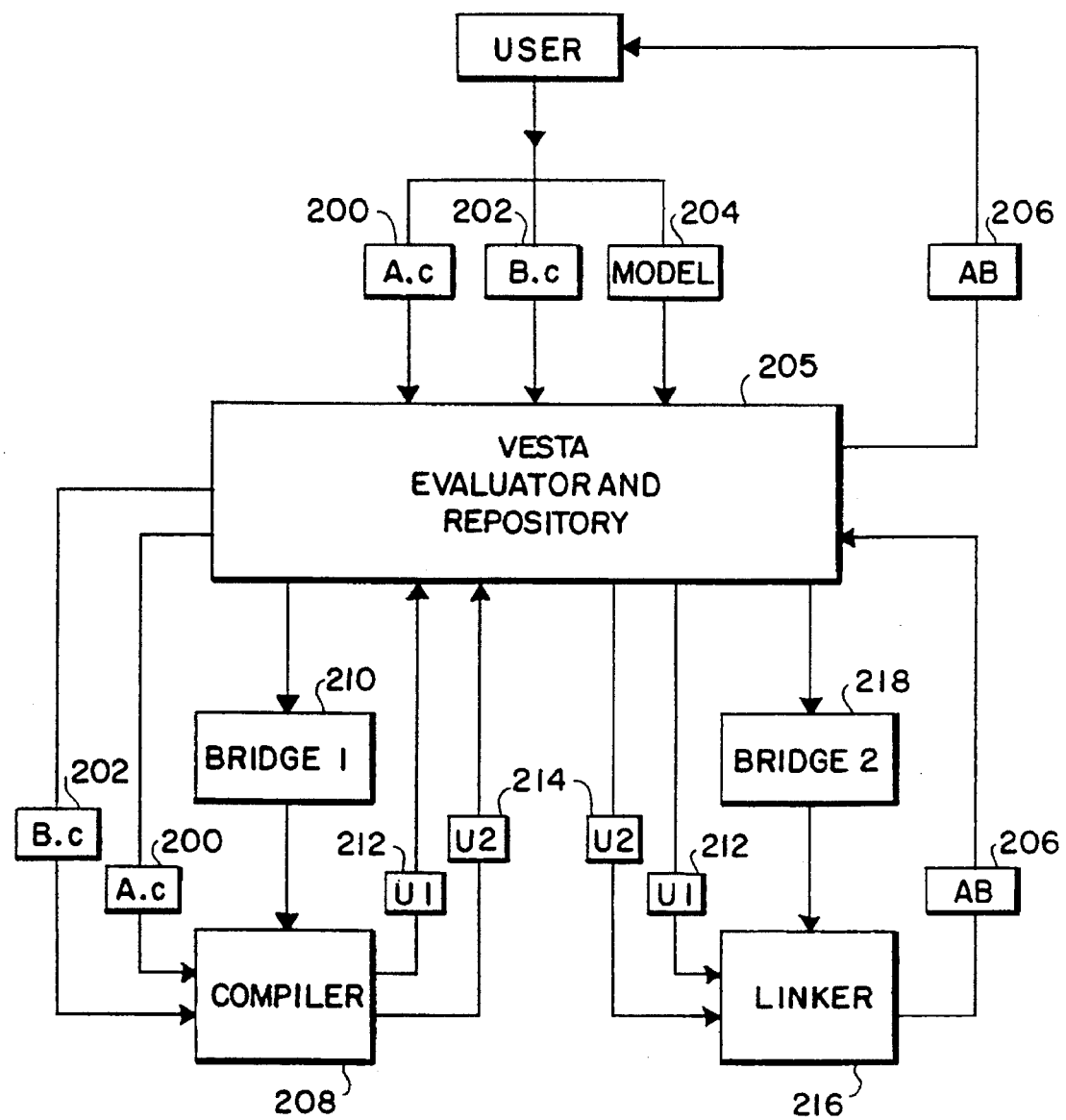
FIG. 9 is a model of user interaction and workflow through Vesta.

FIG. 8 gives a simplified user's view of interacting with the Vesta system. The user provides files A.c 200, B.c 202, and the system model "Model" 204 to the Vesta system 205, and gets back the executable AB 206. The system model describes how A.c 200 and B.c 202 are compiled and linked to produce AB 206. FIG. 9 is an elaboration of FIG. 8; it shows how the work flows internally through the components of the Vesta system. In FIG. 9, the user provides files A.c 200, B.c 202, and the system model "Model" 204 to the Vesta system 205 which consists of the Vesta evaluator and the Vesta repository. The Vesta system 205 sends the files A.c 200 and B.c 202 to the Compiler 208. The Vesta system 205 interacts with the Compiler 208 through an interface, Bridge1 210. The Compiler 208 produces object code files, u1 212 and u2 214, which are sent to the Vesta system 205. The Vesta system 205 sends the object code files 212, 214 to the Linker 216. The Vesta system interacts with the Linker 216 through an interface, Bridge2 218. The Linker 216 links the object code files 212, 214 into an executable file AB 206, which it sends to the Vesta system 205. The Vesta system 205 then provides the executable file AB 206 to the user.

An example of a situation where Vesta is useful is a large project employing in excess of twenty-five programmers on a software system containing over one million lines of code where the configuration management system is used to construct the entire project. The entire project consists of the operating system kernel and the library files as well as applications.

1.1 The Vesta language

A model describes how the components of a software system fit together. Models correspond roughly to the makefiles of Unix—both describe how to build a software object from its components. But the Vesta language is far more precise and powerful than the approach provided by makefiles.

Unlike make (and most existing configuration management systems), Vesta uses a real programming language to describe configurations and building. Other systems use an ad-hoc approach with many system-building concepts hard-wired into the description language. While some of these system description languages have simple control structures, they have nothing like the abstraction facilities provided by functions. Vesta's programming language provides the flexibility and power needed to scale up to describe large-scale software development.

The Vesta language is functional; it is essentially typed lambda calculus, as described in *Structure and Interpretation of Computer Programs* by Abelson, et al., The MIT Press, 1985, with a small number of additional features. An operation like "compile" is represented in the language as a function. The function inputs are the source files and the options used for the compilation, and the application result is the object file. A software system is built by a series of function applications. "Typed" refers to data types which are described in section 3.

Configuration management is a good domain for functional languages. Functional languages lack widespread acceptance for general programming. Part of the reason is that functional languages can be too restrictive. The lack of assignment and mutable data in functional languages makes it difficult to write many kinds of programs. This limitation is not a restriction for configuration management. The functional model is a very natural way to describe system configuration. The functional model is also a very desirable way to describe system configuration because the absence of side-effects causes the results of evaluating a functional language to be consistently predictable.

Using a functional language also simplifies the language evaluator. A software system is compiled and linked whenever a model is evaluated. To do this fast enough, the evaluator must cache the results of expensive sub-evaluations so that next time the results may be reused. It would be quite complicated to cache expression results if the modelling language permitted side-effects because the application of one function can invalidate the result of another function application. In a functional language this cannot happen.

2. Organizing Software Using Models

This section presents Vesta's approach to organizing software. The Vesta language was designed to support the methodology described in this section.

2.1 Model properties

All models share two fundamental properties. First, a model logically contains all the "text" of a system. Second, functions in the models are used to describe software construction. The next two sections discuss these properties in detail.

2.1.1 Models logically contain all the system text

A model logically contains all the text used to build a software system. This means that it contains all the program code that goes into the system, as well as all the building instructions that tell how to put the code together. Every element that was used in producing the system is explicitly specified in the model, including the interface modules and/or header files, the software libraries, versions of the compilers, compiler options, and hardware platform. Nothing that is not written in the model can influence building. Vesta controls the environment in which compilation and linking occurs so that implicit dependencies not included in the model, such as Unix environment variables, cannot influence building.

Because all the information used to build the system is written in a model, the model gives an exhaustive record of how the system was constructed. This means that exactly the same system may be rebuilt whenever necessary.

A model for a C program logically contains every line of C code that goes into the program, including all the source code in the C libraries. Actually including all this code in the model, however, would make the model difficult to manage and manipulate. Instead, this code is almost always stored in separate source objects. A source object is something that is hand-crafted and cannot be mechanically reproduced. Sources are named in the model by a unique repository identifier or UID. To maintain strict control over each source that logically appears in the model, source files are immutable and immortal; the same UID always refers to the same contents.

System models also logically contain all the building instructions for a given system, including how to build all the tools and libraries used by the application. It would be impractical for every model to include the constructing instructions for the entire environment. Instead, models are modular, and the instructions for constructing different parts of the system are written in different models. Modularity allows a software system to be sensibly divided into subsystems by providing a way to compose the subsystems into a larger system. Models are source objects, and one model can reference another.

2.1.2 Functions describe software construction

Models are written to help localize the binding of choices of how a system is built. When a choice is localized, changing it means making a change in a single place. To achieve this, models use highly-parameterized functions in which most of the choices are passed as parameters to the functions.

Figure 10:
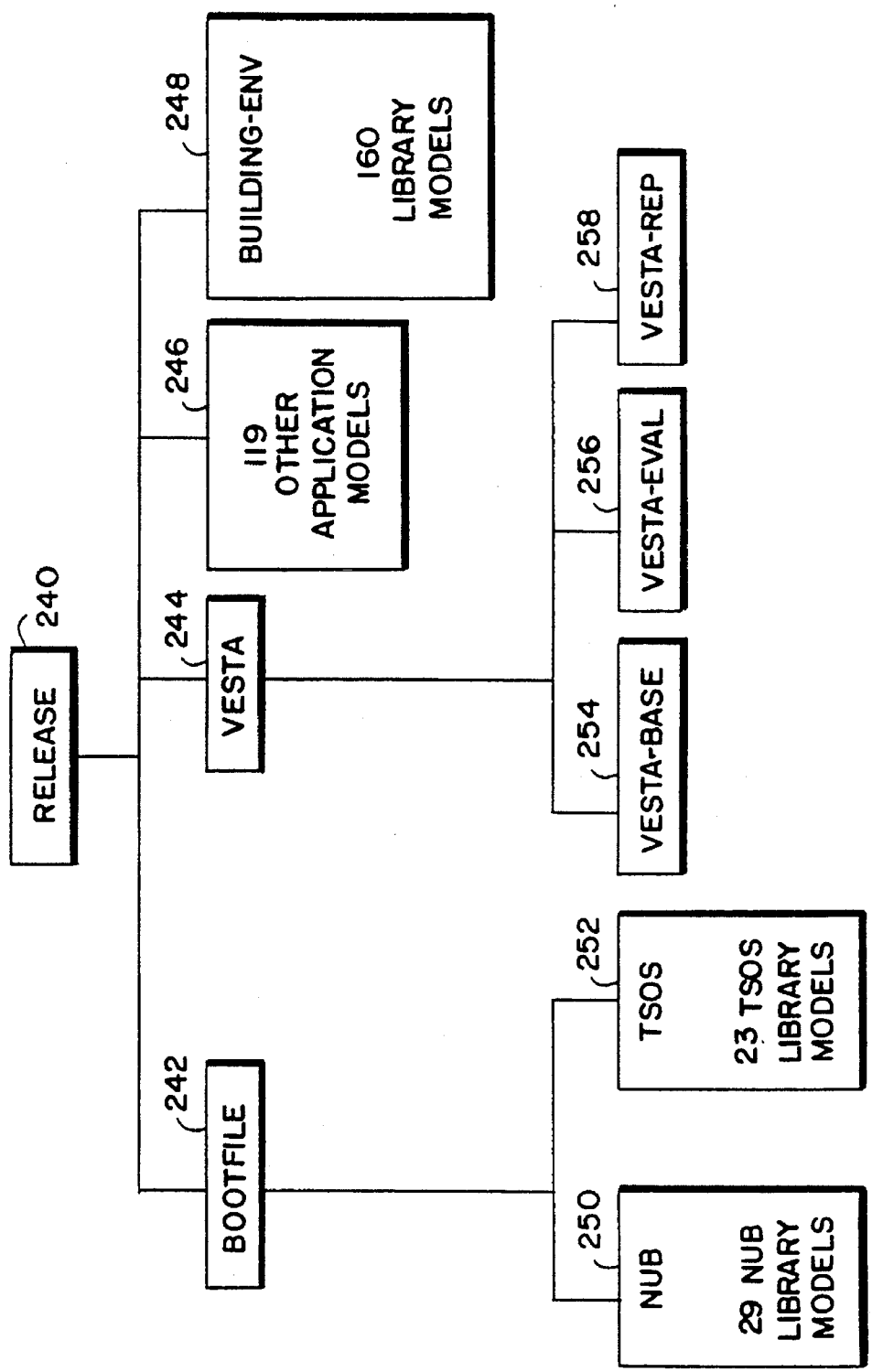
FIG. 10 is a software system release model.

For example, by calling a model for an application program with different parameters, one can build the program for different hardware platforms, or with different versions of the compiler and libraries. Moreover, models are generally organized so that one umbrella model calls functions in many others, passing the same parameter values to each. This makes it easy to change the values used in all the models by changing only the umbrella; one can build a new system release for a different platform by changing just one line in the umbrella release model. FIG. 10 shows the structure of a release umbrella model 240 which invokes the models bootfile 242, vesta 244, various application models 246 and building-env 248, the library models. An umbrella model may invoke other umbrella models. The bootfile model 242 is an umbrella model which invokes the models nub 250 and tacos 252. The vesta model 244, another umbrella model, invokes the models vesta-base 254, vesta-eval 256 and vesta-rep 258.

The localization of choices means that the amount of work that one person must do to modify a system is proportional to the size of the change, not proportional to the size of the system. Building a new system release for a different platform is a conceptually simple change that does not require more human effort than changing the appropriate line in the system description. Of course, a substantial amount of machine time may be needed to complete this build.

2.2 Model structure

Figure 11:
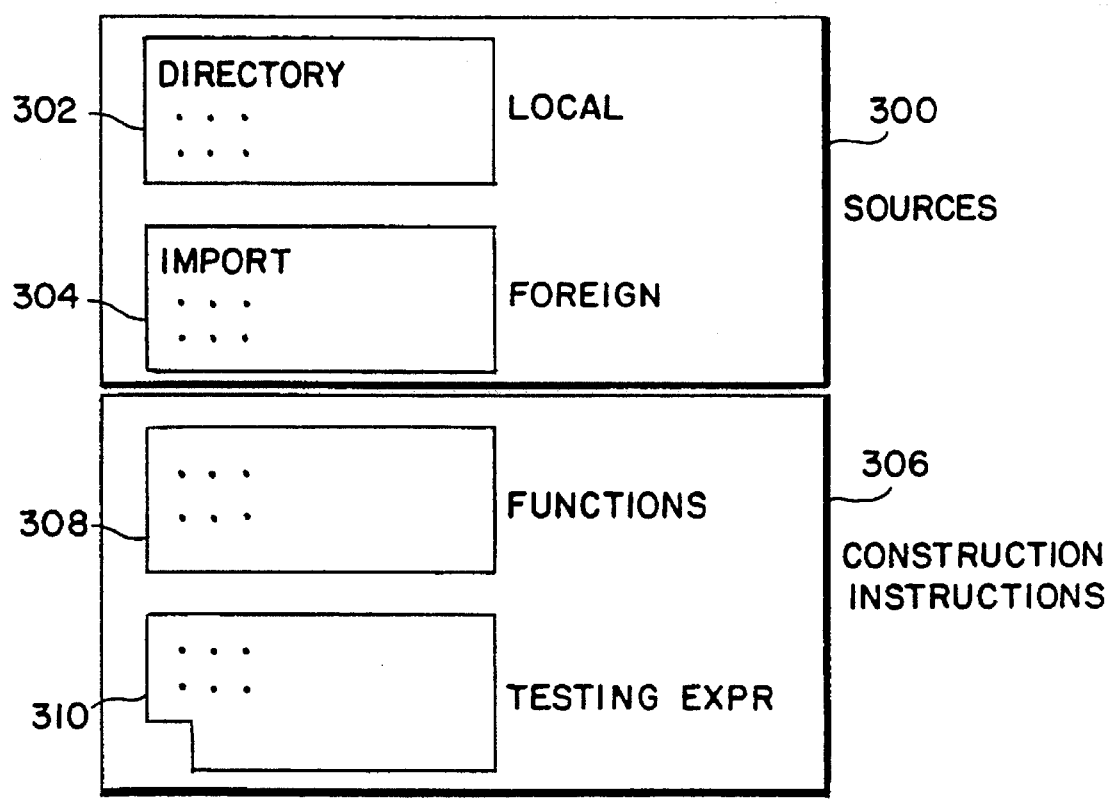
FIG. 11 is an outline of a Vesta model.

A model has two sections: the sources section which names the source files that compose the system, and the construction instructions which tell how to process the source files to build the system. FIG. 11 shows an outline of the sections of a model.

The sources section 300 has two parts. The first part, DIRECTORY 302, names the source files that are local to the subsystem described by the model. The second part, IMPORT 304, names the models that come from the surrounding environment.

The construction instructions section 306 also has two parts. The first part, the functions 308, provides the highly parameterized functions that describe how the sources are composed during building. The second part, the testing expression 310, contains applications of these functions to actually build a system. This is called a "testing expression" because it builds a component for local testing. Releases build components in higher levels of the release model.

TABLE A1

```
DIRECTORY
    hello.c = <uid1>
IMPORT
    building-env.v = <uid2>
IN {
    build =
        FUNCTION ... IN {
            hello = C$Prog((C$Compile(hello.c), libc.a))};
    test =
        LET building-env.v$default() IN build ()
    }
```

Table A1 shows a simple Vesta model that builds a "hello" program. The details of the model are discussed in the next chapter. The model is here simply to show the basic model structure.

The sources section in Table A1 contains two source files. hello.c is the source file local to the model; building-env.v is an imported model that provides the environment necessary to build the program. Both sources are named by their UIDs, which are abbreviated here with the token <uidn>.

The construction instructions section contains two components. The section labeled "build" is one function that defines the compilation and linking of the "hello" program. The section labeled "test" applies the build function, as well as a function from building-env.v called "default," which supplies the default environment in which to build the program.

The test expression is used by the software developer who develops this model to test her program using a given version of the environment. This program may also be built for a system release. In this case, the build function will be called from the release umbrella model, perhaps using a different environment. This is why the model separates the build function from the test expression. The build function may be called from multiple different contexts. A function like build, which may be called from outside the model, is written to assume that a building environment has already been established before it is applied.

2.3 Updating a model

Since models and other programming modules are usually source objects, they are immutable. To make a "change" to a source object, a new version of the object must be created. Table A2 contains an example, a model called lib.v.3. The name of the model is a simplification of the naming scheme used for source objects in the Vesta system.

TABLE A2

```
DIRECTORY
    A.c = <uid1>,
    A.h = <uid2>,
    B.c = <uid3>,
    B.h = <uid4>,
IN
    ...
    C$Compile(A.c, A.h),
    C$Compile(B.c, B.h),
    ...
```

If the user wants to "change" A.h, one of the files given as an argument to C$Compile, she must produce a new version of A.h with a new UID, and use that new UID in a new version of the model, called lib.v.4, shown in Table A3.

TABLE A3

```
DIRECTORY
    A.c = <uid1>,
    A.h = <uid5>,
    B.c = <uid3>,
    B.h = <uid4>,
IN
    ...
    C$Compile(A.c, A.h),
    C$Compile(B.c, B.h),
    ...
```

Because a user must explicitly indicate that the original version of a source is to be updated to a newer version, she has complete control over incorporating other's changes into her own model. For example, the model in Table A1 imports a particular version of the building-env.v model. Another user may modify the environment and release a new version of the model, but the user working on the "hello" model is completely insulated from these changes. The old versions continue to exist, and she may continue to import the old versions until she is ready to change to the newer ones. In this way, users are protected from arbitrary changes in their environment. Tools are available in Vesta to help users create updated versions of existing models, both for source objects local to their model and for imported models.

2.4 Evaluating a model

Most configuration management systems do not incorporate the concept of a specific system configuration. Instead, they use descriptions that refer to mutable files whose contents may change. Their building tools must determine whether any of the mutable files named in the description changed, and then what to do about it. With make, for example, the rule is that if file Y depends upon file X, changing X requires Y to be recomputed. If a makefile records that the file A.c depends upon a header file A.h, then A.c must be recompiled when A.h changes.

Vesta cannot use such an approach to rebuilding. Vesta lacks the very idea of a "change" since Vesta's models are immutable. As discussed in Section 2.3, if a new version of A.h is produced, then a new version of the model, lib.v.4, may be created to incorporate the new file. Source objects in a model do not change because a model describes a particular immutable state.

Objects in Vesta do not change, but they do stay the same, and the Vesta evaluator takes advantage of this. In particular, the evaluator notices when two functions applications are the same, even in different models. This occurs when the function and the values of its parameters are identical. The application C$Compile (B.c, B.h) is the same in both models because the function and parameters are identical. If the result of this function was computed when evaluating lib.v.3, the same result can be reused during the evaluation of lib.v.4. Reusing the result of a function already evaluated is the job of the caching machinery, discussed in detail in Sections 4 through 7.

On the other hand, in lib.v.4, the function application C$Compile (A. c, A.h) is different from the similar one in lib.v.3, since the parameter A.h has a different value between the two applications. When the evaluator first analyzes lib.v.4 it decides that this result does not yet exist, so the function application is performed. In general, a function application is performed when the result of that application does not already exist in the cache.

2.5 Constructing the environment

A model's construction instructions describe the entire software system. Evaluating those instructions builds the entire software system. Each time the system is built, the entire model is evaluated and whatever parts must be built, are built.

In the "hello" model in Table A1, the instructions for constructing the environment are executed when the building-env.v$default function is applied. Every time the "hello" model is evaluated the entire environment is built. This means that instead of evaluating a four line program (hello.c), the evaluator analyzes a system with many thousands of lines (the code for the libraries and the compiler and linker, and for hello.c). This may seem unnecessarily aggressive, but caching makes the parts of this very fast that have been done before.

Since the environment is built upon every application, a consistent build is always produced. A user may write a new model specifying a new component of a library, even the lowest level interface, and know that every function application with that component as a parameter will be evaluated and a consistent environment will result. Also, a tool maintainer can modify a tool and incorporate the new tool in the environment, knowing that all necessary processing with that tool will be performed. There is a separate way for a tool maintainer to assert that one version of a tool is upward compatible with an older version, so that all results produced using the old tool may be reused.

2.6 Repository functionality

The Vesta repository provides management and naming of the different versions of objects. There are two kinds of objects, source and derived. Source objects were introduced in Section 2.1.1; they are hand-written objects. Derived objects are those mechanically produced, from sources or other deriveds. Like source objects, derived objects are named by UIDs.

There are four repository functions that are referenced in the sections to follow:

NameSource( ) -→UID: This function produces a new source UID. The only requirement for a source UID is that it be unique. UIDs produced by NameSource are distinct from those produced by NameDerived.

NameDerived(inp: LONGINT)→UID: This function produces a new derived UID. The derived UID is completely determined by the value of inp. If NameDerived is called twice with the same value for inp, it will produce the same UID. UIDs produced by NameSource are distinct from those produced by NameDerived.

Write(uid: UID, t: Text): This function takes a UID and a Vesta text value and associates the UID with the text.

Read(uid: UID) →Text: This function takes a UID and returns the Vesta text value associated with that UID.

3 The Vesta language

The language is typed lambda calculus with a few additional features needed for configuration management. It does not include many traditional features of general-purpose functional languages, such as explicit support for recursion and data abstraction. This section gives a brief overview of the features that the language does contain.

The language is a purely functional, modular language. It is composed of expressions which when evaluated produce values.

The type system is simple, with a few basic types: boolean, integer, text, function, opaque, binding, and list. Lists are like LISP lists. Bindings are sets of name-value pairs.

Opaque types are associated with language bridges, which provide a way to invoke compilers and other tools from a model and which can extend the language's type system. A bridge is the intermediary between the evaluator and an individual compiler or tool. Bridges produce values with opaque types; only the bridge that produces a value of a specific opaque type can manipulate it.

The language is dynamically typed; that is, types are associated with values instead of with names and expressions. Type-checking occurs as the model is evaluated; that is, as the software system is being compiled and linked.

Even without static type checking, the language is strongly typed: an executing model cannot breach the language's type system. The expected types of parameters to language primitives are defined in the language documentation, and actual parameters to primitive functions are checked when the model is evaluated. Bridges cooperate in the implementation of strong typing by type-checking the parameters to the functions that they export.

The basic scoping mechanism is static (or lexical). The language also has dynamic scoping for free variables in specially-defined functions. Dynamically scoped names are not lexically distinct from statically-scoped ones.

There are a just a few kinds of expressions. Sets of name-value pairs (or bindings) are introduced into the environment via a LET expression. The value paired with a particular name is selected from a binding with a selection expression, binding$name. Functions are defined with the FUNCTION expression and used in function application. There is a traditional IF conditional. The DIRECTORY expression resembles LET, but introduces name-value bindings into the environment in which each value represents an object in the repository object store.

There are also about fifty built-in functions, which perform arithmetic and boolean operations and provide basic manipulation on texts, lists, and bindings.

The language supports higher-order functions. Higher-order functions are functions which return functions.

The language provides a way of defaulting actual parameters at the point of function application. The language also permits defaulting of formal parameters at the point of function definition (which is simply another way of saying that it supports dynamic scoping).

3.1 A model describes a specific, complete configuration

A model refers immutably to particular versions of source files and imported models. Once a model is created it never changes.

A model describes the construction of an entire software system, including the construction of the environment used by the system. To make it feasible to write and modify such descriptions, the Vesta language is modular. Modularity means that a system description can be broken into several lexically separate parts that build on each other. Modularity also supports abstraction. One programmer can build upon the work of another without needing to understand all of its details.

3.1.2 Language details: DIRECTORY and UID expressions

In the language, each model is a module: a lexically separate piece of text, stored in the repository as a source object and named by a UID. The DIRECTORY expression is the only top-level expression of a model, and it may only appear as the top-level expression. FIG. 10 in Section 2.2 shows the structure of the DIRECTORY expression.

The sources section has two parts: one for objects local to the model's component and one for objects that come from its environment. These two parts are evaluated identically by the language interpreter, but other tools that process models may treat them differently.

The only expressions that may appear in the sources section are sequences of explicit bindings separated by commas. The left-hand side of an explicit binding is an identifier and the right-hand side is a UID: a unique repository identifier.

Each UID in the directory expression names a source file. Sources are either models or non-models. These two cases are evaluated differently. If the UID names a non-model, the UID is evaluated by reading the source using the repository's Read function (see Section 2.6). The Read returns a text value. If the UID names a model, the model is read, parsed, and evaluated. The result of evaluating a model UID is a Vesta value.

The UID may appear only in the sources section of a DIRECTORY expression, on the right-hand side of an explicit binding. This restriction makes it easy for tools to find all UIDs in a model. In the body of the model, the repository object is referenced by the name to which it is bound in the sources section.

The result of evaluating the sources section is a Vesta binding, which becomes the initial environment for evaluating the construction section.

3.2 All dependencies are captured in the model

The language permits a precise description that captures all of the dependencies of the system-building operations. For each operation, the output is completely determined by the inputs of ! 0 the operation; these inputs must all be explicit in the model. This approach is supported by a functional programming language, since the system-building operations are pure functions with no side-effects. The dependencies of the operation are the parameters to the functions.

Functions are at the core of the language; they provide a powerful abstraction mechanism in which a user who wants to invoke a function needs only to understand the function signature, not the details of the function body. There are several different kinds of functions that may be used in a model. Bridge functions supply the basic system-building operations like compilation and linking. Primitive functions permit the manipulation of texts, lists, and bindings. User written functions let a user create his own abstractions by packaging together related calls on other functions.

3.2.1 Language details: FUNCTION expression and closure value

A FUNCTION expression defines a function. The system model in Table A4 contains a single function definition which processes a Unix man page.

TABLE A4

DIRECTORY
    Printing.man = \<uid1\>
IN {
    doc = FUNCTION ComputeManPage IN
        { Printing.1 = ComputeManPage(Printing.man) }
}

The result of evaluating a FUNCTION expression is a closure value, which contains the traditional pieces: the function's formal parameters, the function body, and the static environment needed to evaluate the function body.

3.3 Models provide a single, uniform naming mechanism

In traditional programming environments, there are several different name spaces that a programmer must understand and manage. In a Unix environment, the names spaces include file system path names, environment variables, linker symbols, target names in makefiles, etc. The rules for modifying these name spaces vary, and interaction between them can be confusing.

Vesta provides a single, uniform naming mechanism, so that a programmer needs only to use a single mechanism, with the familiar language features of name binding and scoping.

Bridges also benefit from Vesta's naming scheme. In most configuration management systems, a tool like a compiler or linker must understand how to access many different name spaces, and must make rules about how the name spaces interact. With Vesta, all the names that a tool references are interpreted in Vesta's name scope.

Models add names to the environment using bindings, and bindings are the basic structuring mechanism for the values in models. Many models chiefly manipulate bindings, since configuration management for a large system requires moving around a lot of names along with their values. Bindings provide convenient manipulation of large groups of names and their values.

3.3.1 Language details: binding expression and value

A binding expression is a list of components enclosed within curly braces, {and }. A binding expression evaluates to a binding value, which is a set of name-value pairs.

A binding component may be either an explicit binding or an arbitrary expression. The left-hand side of an explicit binding is a name, followed by an equals sign, and the right-hand side is an arbitrary expression. An explicit binding evaluates to a binding that contains a single name-value pair. If instead the binding component is an arbitrary expression, the expression must evaluate to a binding value. Consider the following binding expression:

{Log =M2$Prog (M2$Compile (Log.mod)), LogUtilities ( ) }

The first binding component is an explicit binding. The second component is a function application, which must return a binding value.

If two binding components are separated by a comma, then each component is evaluated in the initial environment of the expression to produce two binding values, b1 and b2. The resulting binding value is produced by merging the two bindings, after removing all elements from b1 for which an element with the same name exists in b2.

Semicolons are also permitted in bindings. The result of evaluating:

{x; y} is equivalent to evaluating the expression

{x, LET x IN y}.

So, for example, the result of evaluating the binding:

{a=3, b=4; a=plus(a, b) }

10 is a binding value with two name-value pairs: <a, 7>and <b, 4>.

Bindings are "opened" by the syntactic construct LET. The LET expression adds new name-value pairs to the environment in which the LET body is evaluated. In the expression "LET E1 IN E2," it is an error if E1 does not evaluate to a binding.

The selection operator "$" selects a particular name from a binding. The syntactic form of a name selection is E$N. The expression E must evaluate to a binding value, and the identifier N must be one of the identifiers in the binding value. The result is the value associated with N in the binding value.

3.4 Users can add new bridges as needed

Bridges are not written in the Vesta language, but they add functionality that is accessible from the language. Bridges extend the basic functionality that is provided by the Vesta evaluator by providing new functions.

Users can add bridges for new compilers or other language processors whenever such tools are needed. A bridge is loaded dynamically during an evaluation. When the bridge is loaded, it tells the Vesta evaluator the names and signatures of the functions it implements. When one of these functions is called during an evaluation, the evaluator invokes the bridge to execute the function.

The language supports bridges by providing an extensible type system. Bridges cooperate in the implementation of strong typing by type-checking the parameters to the functions that they export.

The language also supports versioning of bridges and tools. The types, functions, and instances of the types exported by a tool are versioned.

3.4.1 Language details: opaque types and the bridge primitive

Bridges are responsible for defining, manipulating, and type-checking values with opaque types. A bridge distinguishes between the various opaque types that it defines and checks that the proper types are passed to the correct functions.

For example, consider the following (erroneous) bridge call:

M2$Prog((M2$compile (Log.def), M2$Compile (Log .mod)))

The M2$Prog function is passed two files: a compiled interface module and an object module. The M2 bridge uses distinct opaque types for these two values. However, the Prog function accepts only object modules for linking. When presented with this parameter list, the bridge signals a type error.

The bridge primitive function makes a bridge and its facilities available for use in a model. The bridge function returns a binding which defines the available facilities. Typically, a bridge will export functions and default parameters which may be used (or overridden) when one of the functions is applied.

There are exactly two ways to define a function: one is to write FUNCTION, and the other is to use the bridge primitive.

3.5 Models are concise

A model provides a complete description of a software system, in which all the dependencies of any given operation are captured in a model. There is a tension between providing a complete description while also making it easy to create new models and read or modify existing ones. A naive approach to writing a complete description would produce a large, unwieldy model that would be difficult to read or modify.

The problem of producing concise models is addressed by certain features of functions and function applications, highlighted below.

3.5.1 A realistic function and its application

The example of a typical function and its application introduced here will be used throughout the rest of the section, although the signature of the function will change as different language features are discussed.

Consider the function "Compile." The inputs to "Compile," such as the source files and options, are parameters. One possible signature of the Module-2+ Compile function is:

FUNCTION M2-Source, M2-Imports, M2-Options where M2-Source is a text, M2-Imports is a list, and M2-Options is a binding.

The Module-2+ bridge type-checks these parameters when the Compile function is applied.

Consider the compilation of the Module-2+ source file Val.mod. In Modula-2+, one module can use definitions from other modules via the IMPORT statement. The Modula-2+ IMPORT statement is different from the Vesta IMPORT statement. The Module-2+ IMPORT statement inside Val.mod is:

IMPORT VestaUID, VestaValue, VestaETypes, Env, Expr,
    Globals, Err, Prim, Location, EvalFriends, EHandle,
  Cache, VestaLog, VestaAST, Bridge, Lex, TagV;

To compile this file, a Vesta invocation of Compile must list all the imported modules, in addition to the name of the source to be compiled and the name of the compilation options. The Module-2+ bridge names the imported modules using the convention that a Vesta name is the Module-2+ module name appended with the string ".d":

M2$Compile(
    Val.mod,
    ( VestaUID.d, VestaValue.d, VestaETypes.d, Env,d,
    Expr.d, Globals.d, Err.d, Prim.d, Location.d,
    EvalFriends.d, EHandle.d, Cache.d, VestaLog.d,
    VestaAST.d, Bridge.d, Lex.d, TagV.d ),
    M2-Options )

This invocation uses positional notation to match actuals to formals. Positional matching requires order in the actuals, and so the actual parameters are ordered in a list. Positional matching is useful when there are a small number of actuals, but it becomes clumsy and error-prone when the number of actuals grows. The next two sections discuss how to make invocations of "Compile" more compact.

3.5.2 Defaulting actual parameters

As shown above, there are three parameters to M2$Compile: the source to be compiled, the imports of the source, and the compilation options. For different invocations of M2$Compile the source and imports will be different, but the compilation options will usually stay the same. It would be useful to be able to specify the compilation options in one place in a model and then omit naming the compilation options on each call to M2$Compile. The language supports this with the defaulting of actual parameters by name.

If an actual parameter is not supplied for a formal at a function application, the Vesta evaluator will look in the current scope to see if there is a definition with the same name as the formal. With actual defaulting, the call to M2$Compile can be rewritten as:

```
M2$Compile(
    Val.mod,
    (   VestaUID.d, VestaValue.d, VestaETypes.d, Env.d, Expr.d,
        Globals.d, Err.d, Prim.d, Location.d, EvalFriends.d,
        EHandle.d, Cache.d, VestaLog.d, VestaAST.d, Bridge.d,
        Lex.d, TagV.d ))
```

The function definition names three formal parameters, but this application only supplies the first two actuals. The supplied actuals are matched by position. The remaining formal, M2-Options, is looked up by name in the scope of the function application; it is an error if there is no definition. Thus, M2-Options can be bound once for a number of calls to Compile.

The invocation of M2$Compile has gotten a little shorter and easier to read and write, but the inclusion of the imports is still unwieldy, and the user is simply repeating information already contained in the Module-2+ source module. Listing the imports again is error prone since a user may not keep the two lists in synchronization. The next section discusses how to eliminate the need to list the imported interfaces.

3.5.3 Defaulting formal parameters

The language further simplifies function definition and application by supporting implicit parameterization. Implicit parameterization allows clients to omit formal parameters from the function definition and then omit the corresponding actuals from the function application. The function body therefore contains free variables, which are names referenced in the function that are not one of the formal parameters of the function and are not otherwise defined in the body of the function. A free variable is bound either from the static environment of the function or from the dynamic environment that invokes the function. The static environment takes precedence over the dynamic environment.

The signature for M2$Compile indicates the possibility of free variables as follows:

FUNCTION M2-Source, M2-Options . . .

The token ". . ." is part of the language syntax, and the three dots appear literally in the function definition. The token ". . ." indicates that formal parameters are omitted from the function definition.

Since only two formal parameters appear explicitly in the function definition, at most two actual parameters can appear in the application. Assuming that the actual for M2-Options is defaulted as in the previous section, the application of M2$Compile reads:

M2$Compile (Val.mod)

This is a clear improvement on the bulky actual parameter list of the previous section. The function application now explicitly mentions only the interesting parameter; everything else is bound by other means.

In particular, the free variables in the function body are the imported interfaces of Val.mod. Because these implicit parameters are determined when the function body is applied, there is no need for the user to bundle up the imports ahead of time in a list, as in Sections 3.5.1 and 3.5.2. Each import is a separate implicit parameter to M2$Compile.

As described above, if a free variable is not statically bound, and its enclosing function signature contains ". . ." the free variable is bound to a value in the environment of the function application. Such a free variable is looked up in this environment when the function body is executed. To get access to the function application environment while evaluating the function body, the language uses dynamic scoping to bind such a free variable occurrence.

Note that the implicit formal parameters may change from one invocation of the function to the next. The only implicit formals that are looked up are those used along the current execution path; there may be others on other code paths that are not referenced. Also, implicit formals may depend on another parameter. In the example above, the implicit formals are the imports of the module Val.mod. If M2$Compile if invoked with a different source module its imports would probably be different.

In summary, omitting the formal and actual parameter list makes models quite a bit shorter and easier to read, and requires a user to write less redundant information.

3.5.3.1 Language details: scoping and function application

The basic scoping mechanism is static (or lexical); that is, free variables in a function get their values from the environment in which the function is defined. To implement static scoping, the Vesta evaluator maintains a static scope.

Typically, in a statically scoped language, each use of an identifier is associated with the innermost lexically apparent definition of that identifier. Because the language has binding values, however, the place where a given identifier receives its value cannot be determined in general until the model is evaluated.

If a function is defined with ". . ." in its signature, dynamic scoping as well as static scoping is used for the identifiers in its body. With dynamic scoping, free variables in a function get their values from the environment in which the function was called. To implement dynamic scoping, the Vesta evaluator also maintains a dynamic scope. When a free variable in a function defined with ". . ." is looked up in the environment, the static scope is searched first, then the dynamic scope.

3.5.4 Bridges generate names

Names may be introduced into a scope in two ways: a user may write the name in the model, or the name may be returned as part of the result of a bridge function application.

This section discusses the second of these two. Consider the compilation of interface module Expr.def:

M2$ Compile(Expr. def)

This bridge call returns a single-element binding, with the name Expr.d and the value of the compiled interface module. In doing this, the bridge is constructing a binding containing a name that does not appear in the Vesta model; it is manufacturing a new name derived from its input. Since a programmer who uses the bridge needs to understand what names it can generate, the rules appear in the bridge's documentation.

Because bridges can introduce names into a model, a user cannot systematically replace all occurrences of one name with another and still be certain that the program means the same. This is because all of the names do not appear textually in the model. To make a name substitution, the user must take into account the rules that the bridge uses to generate new names.

3.6 Intermediate results are conveniently packaged

Some language processors produce results that will subsequently be analyzed by other language processors. The results from the first processor need to be bundled together for convenient analysis by the second processor.

For example, a Remote Procedure Call (RPC) stub generator produces several files that need to be compiled, some for use by the client and some for use by the server. Depending upon which options are used, varying numbers of files are produced. The RPC stub generator could return a binding that contains each of the files, but this would be clumsy for the client to handle since the output files may vary in number. The most convenient way to process the output files would be for the RPC stub generator to return two functions, one that compiles the server files and one that compiles the client files.

3.6.1 Language details: closure value

A closure value is the result of evaluating a function definition. A closure is a first-class value; it may be passed as an parameter and returned as a result. The language provides higher-order functions which can take functions as parameters and return functions as their result. The RPC generator can directly exploit this feature.

3.7 The type system supports program clarity

A programming language's type system can be both a help and a hindrance to a programmer. A type system can make a program easier to understand, since a programmer must follow a certain disciplined style imposed by the type system. Also, type checking detects certain kinds of programming errors that could cause incorrect program execution. On the other hand, a type system may be so restrictive that the programmer must strain to express certain ideas in the language. In the worst case, a type system can prevent a programmer from formulating some meaningful ideas. The Vesta language is strongly and dynamically typed.

4 The Vesta evaluator

The Vesta evaluator analyzes system descriptions, or models, written in the Vesta language. As these descriptions are evaluated the software system is built. This sections gives a brief overview of the design of the evaluator.

The Vesta evaluator has very different performance requirements from an evaluator for a general-purpose functional language. In the Vesta language the expensive operations are applications of bridge functions such as compilation or linking. Other parts of a Vesta model are comparatively inexpensive. This means that an interpreter is fast enough to process models. An interpreter evaluates the expressions in the model as it evaluates the model; type-checking is done during model evaluation.

The interpreter uses lazy evaluation; that is, a value is computed only when it is needed. Furthermore, a lazy value is unlazied only once, not every time that the value is needed.

Lazy evaluation is used by the Vesta evaluator as a performance enhancer. It is useful in the implementation of the Vesta evaluator but is not a necessary component of the language definition. There are no language features that depend upon lazy evaluation.

Lazy evaluation improves performance when models are evaluated. It is common for a model to import a substantial name scope (i.e., a binding) from another model, e.g., a set of related interfaces and implementations. The importer then typically uses only a subset of the imported names, so generating values for all of them would be unnecessarily time-consuming (though semantically correct). A lazy value is, in effect, a spontaneously-created closure; that is, the value is an expression together with the current environment at the time the lazy value was created. In this example, the evaluator assigns lazy values to the elements of the binding, thereby deferring the computation of those values until individual names are referenced and eliminating the computation of values that are never referenced.

4.1 Caching the result of expression evaluation

The language describes software systems in terms of source objects only. In principle, the Vesta evaluator works by evaluating the entire tree of models imported by the model it is working on, rebuilding all their components from source. But obviously it would be far too time-consuming to do this on every evaluation. Building the compilers alone could take several hours and several more to build the libraries.

To speed up evaluation, the Vesta system caches the previous results of evaluating expensive expressions. The evaluator stores the expression and the result in a cache entry. Before an expensive expression is evaluated, the evaluator checks to see if a cache entry for that expression already exists; if so, the expression is not reevaluated. In Vesta models, function applications that require bridge calls are by far the most expensive expressions to evaluate, so only the results of function applications are cached.

Two function applications that use the same function and the same inputs produce the same result. Because the language is functional, caching function applications is straightforward. A function application can be characterized completely by the function and its explicit and implicit parameters. Because side-effects are not permitted in the language, the only output of a function is its result. If the language were non-functional, the caching mechanism would have to cope with other outputs in addition to the application result.

Cache entries are grouped into separate caches. Caches are saved in persistent storage (the Vesta repository) so that they are available across different instances of the Vesta evaluator. Caches are also automatically shared among users so that one user can benefit from the work that another user has performed.

Vesta caches the result of all function evaluations, from those at the leaves of the dynamic call graph (such as compiling one source file), to those in the middle (such as packaging up a library), all the way to the top. A few primitive function applications are not cached since it is not time-consuming to recompute their results. This multi-level caching scheme permits Vesta to efficiently build and rebuild large software systems since it maximizes the amount of work that does not need to be redone.

Vesta caching has a superficial resemblance to the memoizing technique for functional languages, in that both store a function application and its result value in a table for later reuse. However, memoizing is manual, since a programmer must specify which functions are to be saved, and ephemeral, since memo tables do not last across different instances of the language evaluator. Vesta caching is automatic and persistent.

The next three sections discuss how persistent caching is implemented. The first two sections, Sections 5 and 6, describe how an individual cache entry is constructed. The third section, Section 7, describes how the separate cache entries are grouped together into caches and how cache lookup is performed during evaluation.

5 Cache entry structure

This section presents the basic structure of cache entries and how the cache entry is produced during a function application.

A cache entry corresponds to a function application in the body of some model. There may be many cache entries corresponding to the same syntactic function application in a model, because a function can be applied in different environments.

A cache entry is the triple:

<primary key, secondary key, result value>

A cache hit occurs when the evaluator considers a function application,

F (Args), computes a primary and secondary key, and finds that they match the first two elements of some cache entry triple. The final element is then the result value of the function.

The cache is designed never to hit incorrectly, although it may sometimes miss unnecessarily. The contents of the primary and secondary keys are chosen to minimize unnecessary cache misses. An unnecessary miss may occur when the keys contain superfluous information that is not used when computing the function application result. If only the superfluous information in the key is different, then a cache miss will occur even though a hit would have been appropriate. This issue will be discussed in detail in Sections 5.1 and 5.2.

The primary and secondary keys are separated to facilitate cache lookup. The primary key may be computed at the point of the function application; it is used to find a set of potential cache entries. The secondary key contains the information that is necessary to choose among the set of potential cache entries. See Section 7.3 for details of cache lookup and use of the primary and secondary key.

5.1 The primary cache key

For the function application

F (Args), the primary key is computed from the body of F and the actual parameters, which include Args and any defaulted parameters corresponding to explicit formal parameters. The primary key does not capture all of the function's parameters since it does not include the implicit parameters, also know as the function's free variables (see Section 3.5.3). These are the province of the secondary key, whose construction is described in the next section.

The primary cache key is chosen to quickly narrow the choices of potential cache entries. The primary cache key does not contain just F without Args because this would produce too many potential cache entries after lookup based on such a broad key. For example, in a given model there are many applications of the Compile function, but there are usually very few different cases of applying Compile with the same source object.

As discussed previously, the primary cache key is chosen to minimize unnecessary cache misses. The primary cache key contains the body of F but not the static environment of F. If the static environment of F were included it might cause unnecessary cache misses since many elements of the static environment of F may not actually be used when F is applied. An example is the model in Table A5.

TABLE A5

DIRECTORY
    AVax.def = <uid1>,
    AAlpha.def = <uid2>,
IN {
    intfs = FUNCTION target ... IN
        IF eq(target, "VAX") THEN
            M2$Compile(AVax.def)
        ELSE IF eq(target, "ALPHA") THEN
            M2$Compile(AAlpha.def)
        ELSE
            error("target value is incorrect")
    END
}

The static environment of the function intfs contains both AVax.def and AAlpha.def. For any given application of intfs, however, at most one of these names will actually be used.

The static environment of F need not be included in the primary cache key because the names that are actually used from it will appear in the secondary cache key. This is discussed in the next section.

5.2 The secondary cache key

The secondary cache key is created from the implicit parameters of the function application. Recall from Section 3.5.3 that implicit parameters are the free variables in a function body. A free variable in a function is a name referenced in the function that is not defined in the body of the function and is not one of the formal parameters of the function. In the function in Table A6, the function's explicit free variables are A.def and B.def.

TABLE A6

FUNCTION M2 ... IN {
    M2$Compile(A.def),
    M2$Compile(B.def)
}

When the function is applied, many more implicit free variables may be discovered that are defaulted parameters to the calls to M2$ Compile.

The free variables and their values are used to construct the secondary cache key. As shown in this example, the free variables cannot be determined by a static examination of the function body (see Section 3.5.3), so the evaluator discovers them incrementally as it interprets the body. Generally, for each free variable it encounters, the evaluator adds a name-value pair to a list. At the conclusion of the evaluation, this list becomes the secondary cache key.

Two different applications of the same function may have different free variables. Consider the function in Table A7.

TABLE A7 f = FUNCTION target ... IN
    IF eq(target, "VAX") THEN
        M2$Compile(AVax.def)
    ELSE IF eq(target, "ALPHA") THEN
        M2$Compile(AAlpha.def)
    ELSE
        error("target value is incorrect")
    END If the function application is:

f ("VAX")

the set of free variables includes AVax.def, while for f ("ALPHA")
the set of free variables includes AAlpha.def instead.

As mentioned previously, the secondary cache key is chosen to minimize unnecessary cache misses. Unfortunately, there is one case in Vesta where the secondary key may cause an unnecessary miss. This may occur when the free variable is a composite value (either a list or a binding). In this case, the entire value is recorded as the free-variable value. This simple technique is easy to implement, but it can lead to unnecessary reevaluation. For example, consider g=FUNCTION . . . IN M2$ Prog((M2$ Compile(A.def))).

The name M2 is a free variable in the function g; it is a binding that contains at least the functions Prog and Compile. On a subsequent application of g, if any component of M2 is different, then the application will be reevaluated instead of getting a cache hit. This will happen even if the different component was never used in g, say the Library routine.

There is one more wrinkle about free variables and the secondary cache key: free variables may actually be bound by the function's static environment. For example, consider the model from Section 5.1. For any given evaluation of intfs, at most one of the names AVax.def and AAlpha.def will be encountered by the evaluator as a free variable, and its value will come from the static environment. For any given application of intfs, only the value that is actually used will contribute to the secondary key.

5.3 Determining free variables

As discussed in Section 5.2, each cache entry contains a list of free variables that were accessed during the corresponding function application. This section elaborates on how the free variable list is computed.

A free variable for a given function application may be accessed within the body of that function, or it may be accessed within the body of some function called by that function.

TABLE A8 ship = FUNCTION dir ... IN
    ShipM2Prog(dir, "Bundle", Bundle);
buildAndShip = FUNCTION dir ... IN
    LET M2 IN {
        Bundle = Prog((Compile(Bundle.mod), SL-basics));
        ship(dir) 1;
test =
    LET building-env.v$default() IN buildAndShip("/tmp")

In the fragment of code in Table A8, ShipM2Prog is a free variable in the function ship because it is referenced there but not defined. ShipM2Prog is implicitly referenced in buildAndShip because it is an implicit parameter to the function ship, and since it is referenced but not defined in buildAndShip it is a free variable there. The name ShipM2Prog appears in the binding returned as the result of the function application building-env.vSdefault( ) in test. In general, the discovery of a free variable during an evaluation may require it to be added to several free variable lists.

To implement this requirement, the evaluator interconnects cache entries as follows. Each dynamic function application has an associated cache entry. The cache entries are threaded with parent pointers in a structure that reflects the dynamic call graph of the evaluation. Each cache entry points to the cache entries of the functions that called it.

When a name is looked up in the environment, the evaluator maintains free variable lists by the following simple algorithm:

1. Is the name bound in the current function body? If so, the algorithm terminates.

2. Add the free variable to the list (secondary key) of the cache entry associated with the current function body.

3. Set the current function body and its cache entry by following the parent pointer, then go to step 1.

5.4 Use of fingerprints

The primary and secondary cache keys were previously described as being "computed from" various values. Since these values are potentially large a hashing technique is employed to reduce the keys to a bounded size. The evaluator uses a particularly convenient kind of hashing code called a fingerprint.

Fingerprints provide small, fixed-sized identifiers for values. Because values are unbounded in size and fingerprints are fixed-sized, many values can map to the same fingerprint, as is the case of any fixed-length hash. Unlike ordinary hashing, however, such an occurrence is designed to be extremely uncommon with fingerprints of modest size. As a result, if two fingerprints are equal, the values they stand for are the same, with overwhelmingly high probability. The probability of collisions grows quadratically with the number of values compared, and linearly with their size.

Using fingerprints in cache entries instead of values saves both space and time. A fingerprint comparison is faster than performing a structural comparison of the values, except for the very smallest values. Replacing values with their fingerprints saves space in a cache; this savings is substantial since values can get quite large.

6 Values in cache entries

The Vesta evaluator supports lazy values, error values, and closure values (among others), and these values can lead to problems when they appear in cache entries. The evaluator solves these problems by deleting or fixing up the cache entries after they are built but before they are available for lookups, so that these lookups can proceed efficiently.

The following sections describes lazy values in the result value or the secondary key of a cache entry, error values in the result value, and closure values in the result value or secondary key. This section also discusses the related case where the result of evaluating a model, which can be an arbitrary value, appears in the primary or secondary cache key of a cache entry.

6.1 Lazy values in the result value

As described in Section 4, lazy evaluation is used during model interpretation. After a model is completely evaluated, there may be some lazy values produced during evaluation that were never "unlazied" (simplified). These lazy values were not needed to compute the result value of the model, but they may appear as the result value of some cache entry.

TABLE A9 libs = FUNCTION ... IN {
    filelib = file.v$lib();
    memorylib = memory.v$lib() };
    build = FUNCTION ... IN
        LET M2 IN {
            log = Prog((Compile(Log.mod), libs()$filelib,
            SL-basics))
};
    test =
    LET building-env.v$default() IN build();

For example, after "test" in the model in Table A9 is evaluated, there will be a cache entry for libs ( ). The result of libs () will be a binding, but since the memorylib component was never used during the evaluation, it will be bound to a lazy value in the result.

A lazy value is represented as an unevaluated expression tree together with the environment current at the time the lazy value was created; typically a lazy value is quite large. Because of this, cache entries with lazy values in their result are not persistently cached. At the end of an evaluation, the cache is scanned and any cache entry with a lazy value in its result is discarded. In this example, the cache entry for libs() would not be retained because the value of the memorylib component in the result is lazy.

6.2 Lazy values as free-variable values

Lazy values are not saved as the cache values because the lazy values are too large. Free variables are represented as fixed-sized fingerprints, so the size of the free-variable value does not matter. Lazy values are not cached as a free-variable value because getting a cache hit on such a value is very unlikely. This is because the lazy value contains the entire environment at the time that it was created, so even an irrelevant difference in the environment will produce a different lazy value (fingerprint) and cause a cache miss. This would not be a problem if the evaluator included only the relevant environment values in the lazy value, but determining what is relevant requires essentially complete evaluation of the lazy value's expression, defeating its purpose.

The example in Table A10 is derived from the example in Table A9 above.

TABLE A10

```
DIRECTORY
    Log.mod = <uid1>,
    Log.man = <uid2>,
IMPORT
    file.v = <uid3>,
    memory.v = <uid4>,
    building-env.v = <uid6>
IN      {
    doc = FUNCTION ... IN
            { Log.1 = ComputeManPage(Log.man) };
    libs = {
            filelib = file.v$lib();
            memorylib = memory.v$lib() };
    build = FUNCTION ... IN
            LET M2 IN {
            log = Prog((Compile(Log.mod), libs$filelib, SL-basics)) };
    test =
            LET building-env.v$default() IN {
    build();
    doc() };
}
```

The binding libs is a free variable in the application of "build" and "Prog." The binding libs has two fields: filelib and memorylib. Only filelib is used in this model. Therefore, memorylib is bound to a lazy value. That lazy value contains a number of definitions in its environment, including the binding for Log.man. Every time the user evaluates the model with a different Log.man, the Prog function will be reexecuted also, because the free-variable value libs is different from before.

The evaluator might improve this situation by simplifying free-variable values in cache entries to eliminate lazy values. This works well if the value will be needed later anyway. But if the value is not needed, the evaluator ends up doing a potentially large amount of useless work. In that case, an entire library might be constructed needlessly.

The Vesta evaluator tries to steer a middle ground between leaving lazy components lazy and completely unlazying them. It unlazies the top-level components of composite values, but leaves other lazy values unevaluated. This heuristic approach works in many cases but is not really satisfactory; for a better solution see Section 10.5.

6.3 Errors in the result value

The evaluator does not produce cache entries for function applications that encounter errors during their interpretation. This rule applies recursively to function applications that call the function application that got the error.

There are two reasons for not producing cache entries for function applications that encounter errors. Both reasons reflect the practical realities of using a functional language in an environment that is nonfunctional.

First, some functions produce error messages that are not part of their formal result. Such messages are really harmless side-effects in the sense that the side-effects do not alter the result of evaluation. But if the function applications were cached, on a subsequent re-evaluation the cache hit would prevent the user from seeing the messages again - an unfortunate situation if the original messages were lost. One could eliminate this problem by making error message be the result of the function, so the errors would be retained in the Vesta cache, however, this would introduce other difficulties.

Second, a function evaluation may fail because of a transient system problem. In the ideal, this case would never occur. But in reality, resources are finite and occasionally exhausted. For example, the temporary file space available to compilers is limited, and an application of the Compile function may therefore fail because of inadequate temporary space. Obviously, caching this result is foolish—the user will want to retry to compilation when adequate disk space has been restored.

6.4 Models as free-variable values

As the previous examples, one model references another by simply naming it. In the first model, a DIRECTORY expression binds the second model's name to a UID that names the object in the repository. During evaluation, when the name of the second model is encountered in the body of the first, the second model is read, parsed, and (lazily) evaluated.

The value obtained by evaluating a model may appear as a free-variable value.

TABLE A11

```
DIRECTORY
IMPORT
    vestarep.v = <uid1>,
    vestaeval.v = <uid2>,
    vestabase.v = <uid3>,
IN      {
    intfs = FUNCTION ... IN
```

TABLE A11-continued

```
        vestabase.v$intfs();
        vestarep.v$intfs();
        vestaeval.v$intfs()   };
    .
    .
    .
}
```

For example, in the model to build the Vesta server, shown in Table A11, the models vestabase.v, vestarep.v, and vestaeval.v are all free variables in the function intfs. To check for a cache hit on intfs(), the evaluator would appear to have to read, parse, and (lazily) evaluate all three models. That is a significant amount of work, and reduces or eliminates the usefulness of getting a cache hit.

Instead, the evaluator uses a small trick that gives a substantial performance benefit. The entries in the free-variable list of a cache entry are augmented with an additional Boolean, so that each list member is a triple:

<free var name, free var value, is-a-model>

When "is-a-model" is TRUE, the free variable value is the repository UID of a model, or, more precisely, the fingerprint of the repository UID. Fingerprinting the UID is logically just as good as fingerprinting the (lazily) evaluated model for two reasons: (1) models are immutable, and (2) a model is evaluated in the empty environment and so gets no free variables from the surrounding environment. This UID substitution is much faster, since the model does not have to be read or interpreted at all.

This trick dramatically reduces the evaluation time of a model that references many other models when only a few of these references are different from an earlier evaluation.

6.5 Models in the primary cache key

A similar trick is used when a model is part of the primary cache key. Specifically, when the evaluator sees the syntactic form:

Model$Component(Args)

it creates two cache entries with different primary cache keys. The first is a regular cache entry; the cache key is a function of the values of Model$Component and Args. The second is a special-key cache entry; its primary cache key is computed from only the UID of Model, the name of Component, and the value of Args.

Consequently, if there is a cache hit on the special cache entry, the Model need not be read, parsed, and evaluated. Even if Model is different, there is a chance that the value of Model$Component is not different, and there is still the opportunity to get a cache hit on the regular cache entry.

This simple optimization reaps performance benefits for the same reasons, and in the same situations as described in the previous section.

6.6 Closures in the result value

The language supports first-class functions, which may return other functions as their results, and it is important to be able to cache these result functions. However, saving closures in the result value of a cache entry poses special challenges.

A closure contains an expression body, the formal parameter names, and the static environment. The static environment may contain lazy values. Before the cache entry is saved at the end of evaluation, the lazy values in the static environment are completely evaluated. This is done since lazy values are usually quite large and would take up too much space in the cache. (Also see the discussions of lazy values in Sections 6.1 and 6.2.)

There is one exception to simplifying all the lazy values in the static environment. If the lazy value is produced by evaluating a model, than the value is not simplified but is converted back into the model's UID. This technique is necessary because completely simplifying a model may require a great deal of extra evaluation. One model usually contains a construction component and also imports other models, which in turn import other models which contain construction components and import other models, etc. Completely evaluating a model and its environment could end up causing a complete build of every model in the system.

To make it possible to save closures in result values, the language definition imposes a restriction on the contents of closures' static environments: only names that appear literally and are free in the body of the function definition are included in the static environment of the closure. An example is the model in Table A12.

TABLE A12

```
DIRECTORY
    Text.def = <uid1>,
    Text.mod = <uid2>
IN  {
    intfs = FUNCTION ... IN
        M2$Compile(Text.def),
    impls = FUNCTION ... IN
        M2$Compile(Text.mod)
}
```

The functions intfs and impls are evaluated in the same static environment; this environment contains two definitions, one for Text.def and one for Text.mod. However, the restricted static environment of the intfs closure contains only Text.def, since that is the only name in the static environment which appears literally in the body of the function. Likewise, the restricted static environment of the impls closure contains only Text.mod.

This rule means that (FUNCTION IN body)( ) is not equivalent to body; the former may have fewer free variables when evaluating body, and this can make a difference if body calls functions that take implicit parameters. This is an unusual restriction, but it was found to be necessary to make closures work well with caching.

A closure's static environment is restricted for three reasons: the unrestricted static environment can be quite large and would require too much space to store in a cache in many cases; every value in the static environment needs to be simplified before the closure can be cached; if the static environment contains superfluous entries, unnecessary evaluation can occur; and when a closure appears in the result value of a cache entry, every name in its static environment is a potential free variable for the cache entry.

The example in Table A13 illustrates why the names in the closure's environment are listed as free variables in the cache entry.

TABLE A13

```
LET {x = 3} IN {
    g FUNCTION IN { h = FUNCTION IN x };
    g ( )  }
``` x is in the static environment of the closure bound to h. According to the above rule, all the names in the closure's environment are on the cache entry's free variable list. Since x is defined outside the body of g, x is on the cache entry's free variable list for g( ). If this were not the case, on a subsequent cache lookup the value of x might be different but there would still be a cache hit on the old entry for go, and this would be incorrect.

If there are superfluous names in the static environment then these superfluous names will also appear in the cache-entry free variable list. A different value for one of these superfluous names would cause an unnecessary cache miss.

Even the restricted static environment saved in a cached closure may be an overestimate of what the function body actually requires. An example is the model shown in Table A14.

TABLE A14

```
DIRECTORY
    Text.def = <uid1>,
    IN }
        .
        .
        intfs = FUNCTION ... IN
            LET {M2; flume() } IN {
                Compile (Text. def);
                ... };
        .
        .
        .
    }
```

The static environment of intfs will contain a binding for Text.def since Text.def appears literally in the body of intfs. Once the function intfs is applied, however, it may turn out that Text.def is not a free variable of intfs, if the function application flume( ) returns a binding for Text.def.

Although the restricted static environment may contain an overestimate of what is actually used from the static environment, this has not been a problem in practice. Given the way models are currently written, the conservative static environment usually produces an environment that is close to the ideal.

6.7 Closures as free-variable values

As mentioned above, a closure is composed of an expression body, formal parameter names, and static environment. This means that when a closure is added as a free-variable value, its static environment is included.

When a closure appears as in the secondary cache key this key includes the closure's static environment, restricted as described in the previous section. Because the static environment is included in the key, an evaluation may occasionally miss unnecessarily; if the closure environment contains a definition that is not used in the function application, and that definition is different on a subsequent cache lookup, a miss occurs even though there is no need to reevaluate the expression. An example is the model shown in Table A15.

TABLE A15

```
DIRECTORY
    AVax.def = <uid1>,
    AAlpha.def = <uid2>,
    IN {
        privateIntfs = FUNCTION target ... IN
            IF eq(target, "VAX") THEN
                M2$Compile(AVax.def)
            ELSE IF eq(target, "ALPHA") THEN
                M2$Compile(AAlpha.def)
            ELSE
                error("target value is incorrect")
            END;
        intfs = FUNCTION target ... IN
            LET privateIntfs(target) IN {
                .
                .
                . };
```

The closure privateIntfs is a free variable in the function application intfs( ). The static environment for privateIntfs contains both AVax.def and AAlpha.def. Depending upon the value for target, only one of these interface modules will actually be used by any given application of privateIntfs. But if either of them is different in a later evaluation, there will be a cache miss on the function application for intfs.

This simple approach to handling closures as free-variable values usually performs well, but it does produce unnecessary misses on occasion. It is difficult to do better and not slow down cache lookup noticeably.

7 Caches and cache lookup

The previous sections have discussed cache entries, without considering how the cache entries are organized so that accesses will balance speed and accuracy. Since cache entries are stored persistently (in the repository), disk I/O is required to read them. Storing each cache entry in a separate file would yield an impractically slow evaluator, so related cache entries must be clustered into caches. During an evaluation, various caches are accessed as needed and at the end of an evaluation a new cache is created.

A high cache hit rate is important for performance. If missing in the cache causes a moderate-sized compilation, that costs one thousand times more than a hit. The miss rate is also important to users regardless of how long the compilation takes; users hate to see a module recompiled if they know the compilation is redundant. Still, searching through all the cache entries ever generated is clearly too slow, so entries must be clustered so only the likely ones are searched.

This section examines how cache entries are grouped into caches, how caches are created, and how cache lookup occurs during evaluation. There is also a discussion about how cache entries are purged from caches. The section concludes by describing several flaws in the current design.

7.1 Caches used during cache lookup

A cache is associated with a particular version of a model, and each model has exactly one cache, once evaluated. Each cache is stored in a file in the repository under a UID that is computed from the model's name. Given the name of a model, its cache can be found. Because a cache is associated with a model, a cache produced by one user may be used by another; this allows one user to take advantage of another's work.

During evaluation, a list of currently interesting caches, as explained below, is maintained. Before each function application a cache lookup occurs in each interesting cache until a cache hit occurs or until misses occur in all caches.

During evaluation, a cache is labelled as one of two types. The first type of cache is an ancestor cache, associated with the model that is the immediate ancestor of the root model that the user is evaluating. The second type of cache is an imported cache, associated with some model that is imported directly or indirectly by the root model. Note that the cache type is not an inherent property of a cache, but a property that the cache possesses during a particular evaluation. The importance of these two cache types will become apparent in Section 7.2 below.

The list of interesting caches grows and shrinks during an evaluation. Initially, the list contains only the ancestor cache. During the evaluation, an imported cache is added to the list whenever the evaluator evaluates a new imported model and removed from the list when the evaluator finishes with the model. In other words, the list of interesting caches contains those caches in whose models evaluations are currently proceeding, including the ancestor cache.

7.2 Organizing cache entries into a cache

When a model is evaluated, a single new cache is created for the root model. The imported cache and the ancestor caches are not modified; any new cache entries created during the evaluation go into the new cache for the root model. Also, any cache entries from the ancestor cache (but not from imported caches) for which a hit occurred are copied into the new cache. Consequently, the new cache for the root model contains all the entries that were created during that evaluation, or would have been created if cache hits had not occurred in the ancestor cache during the evaluation. At the end of an evaluation the new cache is saved to persistent storage.

7.3 How cache lookup works

To evaluate a function application, the evaluator performs the following steps:

1. Evaluate the function parameters.
2. Consider the expression for the function. If it is of the form ModelSComponent, then compute the special key (see Section 6.5) and perform a cache lookup (described in detail below). If the lookup gets a hit, return the result value from the cache entry as the result of the function application.
3. Evaluate the function (which, in the case of a miss in step 2, will cause Model to be read, parsed, and evaluated).
4. Construct the static and dynamic environments for the evaluation of the function body, and bind the actual parameters to the formals.
5. Perform a cache lookup (described below). If the lookup gets a hit, return the result as in step 2.
6. Evaluate the function body using the environment constructed in step 4.

In detail, the cache lookup proceeds as follows:

A. The evaluator first computes a primary cache key by fingerprinting the function and its parameters. This computation is different for the two lookups in step 2 and 5 above, as described in Sections 5 and 6.5.

B. For each cache on the list of interesting caches, the evaluator indexes (i.e., hashes into) the cache using the primary key computed in step A. If this produces one or more cache entries, then step C is performed on each of the entries until either a cache hit occurs or the entries are exhausted. If a cache hit occurs, the lookup terminates with a hit; otherwise, the evaluator repeats this step on the next member of the list of interesting caches. If no members remain, the lookup terminates with a miss.

C. The evaluator extracts the secondary cache key from the cache entry under consideration. This is the free variable list (Section 5.2) containing triples of the form <name, value, is-a-model>. For each triple on the list, the evaluator looks up name in the environment; if it is undefined, this cache entry is a miss. Otherwise, the value field is compared to either the name (if is-a-model is TRUE) or the fingerprint of the value of name (if is-a-model is FALSE). An equal comparison causes the evaluator to repeat this step on the next triple of the free variable list. If there are no more entries on the free variable list, a cache hit occurs. An unequal comparison causes the cache entry to miss, and the lookup algorithm continues with the next cache entry per step B.

7.4 Purging cache entries

Once a new cache is created at the end of an evaluation, it is never modified. Individual cache entries are not purged from a cache, but the entire cache and all its cache entries are deleted at the same time.

This approach is appropriate given the way cache entries are organized into caches. The clustering approach for cache entries was chosen was to simplify purging them. A cache is associated with a model, and a cache contains only the cache entries that are needed when evaluating its model.

The cache is therefore just another derived object that is created during the evaluation of the model. Deciding when to delete a cache (or any other derived object created during the evaluation) is not under the purview of the evaluator, but is an administrative issue.

7.5 Bridges and repository caching

The preceding description of caching discussed the techniques used by the evaluator. There is an independent caching mechanism, repository caching, that bridges can exploit to improve on the evaluator's scheme.

During the evaluation of most bridge functions, the bridge will produce one or more derived objects to be stored in Vesta's repository, under a name based on the bridge function and its parameter. This is done using the repository's NameDerived function (see Section 2.6). To implement repository caching, the bridge computes the name to be given to the derived, and checks in the repository to see if the object already exists.

For a bridge to perform repository caching, it must be able to efficiently determine all the inputs to a function without actually performing the function. In some bridge functions this is easy and repository caching is a performance accelerator; in others the bridge must actually perform most of the function to determine the inputs and so bridge caching does not pay off. For example, when compiling a Module-2+ module, only the beginning of the module must be read and parsed to determine the collection of necessary compiled interface modules. In comparison, to determine the inputs for compiling a C file, all of the C header files must be read and parsed. This may take a large fraction of the total compilation time, and so repository caching may not improve performance.

The evaluator does not do repository caching itself because it would need to know all the parameters used to create a derived object, and it is the bridge that determines this in a language-specific way. Repository caching is entirely optional; each bridge can implement it for the functions that can benefit.

7.6 Problems with the current design

There are two problems with the current approach to grouping cache entries into caches. The first is that the cache miss rate is higher than it should be. The second is that, given today's memory costs, memory usage is too great for Vesta to be a viable commercial product. Each of these is discussed in this section.

Because cache entries are associated with root models, cache misses can occur even though a valid cache entry exists in some cache. For example, consider the three models shown in Table A16, Table A17, and Table A18.

TABLE A16

```
lib. 3
DIRECTORY
    A.def = <uid1>,
    B.def = <uid2>,
    A.mod = <uid3>,
    B.mod = <uid4>,
IN    {
    intfs = FUNCTION . . . IN
        LET  M2 IN {
            Compile(A.def),
            Compile(B.def)   };
        impls = FUNCTION . . . IN
        LET  M2 IN {
            Compile(A.mod),
            Compile(B.mod)   };
    }
```

TABLE A17

```
umbrellaOne.5
DIRECTORY
IMPORT
```

TABLE A17-continued

```
        building-env.v = <uid5>,
        lib.v = <uid6>,
    IN
        intfs = FUNCTION ... IN {
            lib.v$intfs();
            .... };
        impls = FUNCTION ... IN
            lib.v$impls(),
            .... };
        test = LET building-env.v$default() IN {
            intfs(); impls()   };
```

TABLE A18

```
    umbrellaTwo.8
    DIRECTORY
    IMPORT
        building-env.v = <uid5>,
        lib.v = <uid6>,
    IN
        intfs  =  FUNCTION ... IN {
            lib.v$intfs();
            .... };
        impls  =  FUNCTION ... IN {
            lib.v$impls(),
            .... };
        test = LET building-env.v$default() IN {
            intfs(); impls() };
```

When umbrellaOne.5 is evaluated, it will apply lib.v$intfs( ) and lib.v$impls( ) in the environment of the building-env.v named by <uid5>. When umbrellaTwo.8 is evaluated, it performs the same function applications in the same environment. But the cache entries from the evaluation of umbrellaOne.5 are stored in the cache for umbrellaOne.5, and there is no way in the current design for the evaluation of umbrellaTwo.8 to find these cache entries.

In this case, repository caching can prevent the bridge from actually having to redo the compilations. This is not an ideal solution, since bridges do not always implement repository caching; if the models were for C programs rather than Module-2+ programs, repository caching would not save much time even if it were implemented. Also, while repository caching may eliminate leaf computations, an evaluation could run much faster with a cache hit at internal function applications. For example, if lib.v$impls( ) contained one thousand compilations instead of just three, the one thousand repository cache hits would still take longer than getting one internal cache hit on the application of lib.v$impls( ).

The second problem with the current design is excess memory usage; the prototype used more memory than would be reasonable for a commercial system today. In the current design, caches are read for every model that is used during the evaluation. Many times there are no useful cache entries in a cache, but the cache is read anyway because there is no simple way to discover in advance that there are no useful cache entries.

Both these problems must be addressed to make the Vesta system performance commercially acceptable. Section 10.4 suggests a different approach.

8 Performance

This section argues that the run-time performance of the Vesta system is comparable to that of the Unix utility make when make is used in a way that avoids inconsistent builds. To support this claim, this section compares the times to build several typical Module-2+ programs using the two different systems. The timings were taken on a Firefly personal workstation. Although the Firefly is a multiprocessor, neither Vesta nor make takes explicit advantage of its multiprocessing capabilities.

The time discussed in this section is from the end of the user's source file edits to the completion of the build, minus the time spent in the compiler and linker (which are the same in each case). For Vesta the time is divided into two parts: the time to create a new immutable model ("Advance") and the time for the evaluator to interpret the new model. For make the time is broken up into three parts: the time spent in the edsel and imc utilities that are used with make to avoid an inconsistent build for Module-2+ programs, plus the time for make to process the makefile.

These timing breakdowns highlight the fact that make and Vesta provide different guarantees. Vesta creates a consistent software system every time since it rebuilds whatever parts of the environment are required. Systems built with make do not build the environment when the client program is constructed; instead, libraries and other environment components are built earlier and simply used during the construction of the client program. In Vesta terminology, the environment components are treated as source objects during the system construction. Given the make building style, additional tools are needed to perform checks to verify a consistent build. The tools described here are specific to Module-2+, but similar tools have been used with other languages.

The edsel utility used with make for Module-2+ programs is similar to makedepend in functionality and performance, but is set up to run automatically from the makefile during each build. Edsel, in conjunction with make, causes the necessary recompilations to be performed for modules that are listed in the makefile. Typically, these are the modules in the makefile that are local to the system being built.

The Inter-Module Checker (imc) handles Module-2+ libraries that are linked into the client program but are not built by the client program's makefile. Because the libraries are not necessarily built in the same environment as the client program, they can be accidentally built with different interfaces. The imc checks interface consistency of all the modules that go into a system and issues an error if they are not built with the same interfaces. Note that the imc can not produce a consistently-built program; it merely can issue an error message if it determines that a consistent program cannot be built. It is then up to the programmer to determine which modules are inconsistent and what needs to be rebuilt.

TABLE A19

| program name | total source lines | number of modules |
|---|---|---|
| Vesta server | 103,295 | 195 |
| loupe | 24,336 | 177 |
| vrweed | 4,563 | 3 |
| hello | 6 | 1 |

TABLE A20

| program name | make (edsel + imc + make) | Vesta (Advance + Vesta server) |
|---|---|---|
| Vesta server | 1:26 | 1:10 |
| loupe | :59 | :39 |
| vrweed | :20 | :08 |
| hello | :07 | :08 |

TABLE A21

| program name | edsel | imc | make | Advance | Vesta server |
|---|---|---|---|---|---|
| Vesta server | :19 | :19 | :48 | :32 | :38 |
| loupe | :10 | :30 | :19 | :21 | :18 |
| vrweed | :08 | :10 | :02 | :06 | :02 |
| hello | :05 | :01 | :01 | :06 | :02 |

TABLE A22

| program name | make (edsel + imc + make) | Vesta (Advance + Vesta server) |
|---|---|---|
| Vesta server | 2:03 | :56 |
| loupe | 1:12 | :39 |
| vrweed | :24 | :08 |

Tables A20 and A21 give timings for a complete build of several programs detailed in Table A19. A complete build is required, for example, when some basic library interface is modified or a new compiler is introduced. The make timings were taken after all the deriveds in the program were deleted, which is much faster than depending on edsel to discover the need for recompilation. (To see this, compare the edsel times reported in Table A21, where all deriveds are deleted, with the edsel times reported in Table A23, where the deriveds cannot be deleted.) Tables A20 and A21 show that, except for the smallest builds, Vesta is 19% to 60% faster than make plus edsel and imc.

TABLE A23

| program name | edsel | imc | make | Advance | Vesta server |
|---|---|---|---|---|---|
| Vesta server | 1:11 | :19 | :33 | :32 | :24 |
| loupe | :24 | :30 | :18 | :22 | .17 |
| vrweed | :13 | :09 | :02 | :06 | :02 |

TABLE A24

| program name | complete build | single-module change |
|---|---|---|
| Vesta server | 1% | 16% |
| loupe | 1% | 15% |
| vrweed | 4% | 6% |
| hello | 10% | |

Tables A22 and A23 gives timings for a build after a change is made to a single implementation module. In this case, Vesta is 46% to 67% faster than make plus edsel and imc.

Table A24 gives the percentage of the total build time spent in Vesta facilities, which includes time spent in Advance and the Vesta server. The percentage of the total build time in Vesta ranges from 1% to 16%.

9 Comparison with other systems

9.1 Cedar System Modeler

Many of the ideas in Vesta originated in the Cedar System Modeler, and Cedar's System Modelling Language (SML) and the Vesta language have many similarities. The Cedar System Modeler was used in a single-language environment to maintain software written in Cedar.

SML is functional and modular, and strongly typed. Bindings are commonly used. First-class functions are supported. System descriptions are written in terms of source objects. System descriptions are complete; they describe all the components that go into building the system.

While there are similarities between the two languages, the System Modeler supports a description language with an elaborate and complex type system. Types in SML are first-class values, and SML implements static type-checking instead of dynamic type-checking like the Vesta language.

The SML type system permits a very elegant system description in which a Cedar interface is a type, and the corresponding Cedar implementation module is an instance of that type. With SML, static type-checking provides earlier warnings about certain kinds of mistakes in a system configuration earlier in the construction process. Unlike the Cedar System Modeler, though, the Vesta system was designed to work in a multi-language environment that could incorporate all existing programming languages. It was discovered that in this environment static type-checking was not feasible.

The SML evaluator caches the results of compilation and linking, but does not cache the results of other function applications. This approach to caching is similar to that used by make and the make variants described below. While this approach provides adequate performance when evaluating small- and medium-sized software systems, the overhead becomes significant when evaluating large systems with thousands of software modules.

9.2 Make

Make and make-like systems are perhaps the most prevalent software building systems. Make has been implemented with slightly different features by a number of vendors, but this section does not need to distinguish among the different versions.

The make system is not integrated with a version control system. To use make with one of the common version control systems such as RCS or SCCS, the files to be compiled must be checked out into a local building area. With Vesta, files do not have to be checked out to be compiled.

The Vesta language has a well-defined semantics that programmers should find familiar, especially programmers with knowledge of functional languages. In contrast, make's semantics are more operational. To understand a complex makefile, a reader must often imagine the actions make might take at each step.

With make, the user describes the software system in terms of the source and object modules that go into the system. The user must think in terms of derived object names, which becomes complex when a system can be built in various ways for multiple platforms, instruction sets, etc. With Vesta, the user describes his system in terms of only the source objects used to build the system.

With make, dependencies for each activity must be explicitly listed; if a user omits a dependency an object might not be rebuilt when it needs to be. Consequently, language-specific generators are often used to generate a makefile with the correct dependencies, but for safety the makefile may need to be generated before every build and running the generator is often time-consuming. With Vesta, the system will determine the dependencies during each evaluation of a model. There is no opportunity for a user to fail to rebuild, as with make; in Vesta, an object will always be built if it has not been created previously.

Make depends upon environmental factors, such as Unix environment variables, that are not specified in the makefile.

For example, Unix make relies on the user's PATH variable to include the right directories. With Vesta, all dependencies are explicitly specified in the model.

With make, only file dependencies are taken into consideration when make decides whether to recompute a derived. This means, for example, that changing a compilation switch does not cause rebuilding. Also, makefiles cannot restrict compilers from using environment variables—since the settings of environment variables are not written down in a makefile this is another unrecorded dependency.

Make uses file dates to determine what to rebuild; if an object predates the modified date of any object it depends on, that object is rebuilt. Whether or not an object is rebuilt depends upon the time stamps of the object and its dependencies, not on whether or not any of the modules in the configuration change. This approach is sufficient as long as progress involves all modules in a system moving forward in time. But consider the following scenario. A user is working on system P, which imports version 5 of interface I from the public area. The user successfully builds system P, but during testing he discovers an error with version 5 and switches back to using version 4 of interface I instead. Since version 4 is older than version 5, make will not rebuild any of the modules in system P that import I. As with the other problems with make, the user is required to work around this limitation by hand.

Make does support recursive invocation of itself to permit decomposition of a large system into several smaller makefiles. The mechanisms for passing a large number of parameters from one makefile to another is clumsy, but this does provide a limited form of makefile modularity.

9.3 Make variants

Several other systems exist that provide the same basic features of make, but include additional features that attempt to correct certain of make's problems. The imake system was created to deal with building the X Window system; ODE-II was created to build OSF software; ClearCase is a commercial product that extends make.

ODE-II and ClearCase provide a way to integrate with a version control system. In both cases, compilations can occur without having files checked out to a local area.

All three systems, imake, ODE-II, and ClearCase, use an extended form of make as their description language. In all three cases the software system is described in terms of the object modules that go into the system, as with make.

The three systems express dependency information differently. In ODE-II, all dependencies must be explicitly listed. Conversely, imake uses a dependency generator that works for C code only; presumably dependencies for other languages need to be explicitly specified. ClearCase does not require build dependencies to be explicitly specified, but build order dependencies of derived objects must be specified. Vesta also requires build-order dependencies to be specified, but the way this is done differs. In ClearCase, the dependency is specified using object files and build rules. In Vesta, the order dependency is specified using scoping and implicit parameters.

With imake and ODE-II, only file dependencies are taken into consideration when deciding whether to recompute a derived. ClearCase takes into account file dependencies as well as the "command line" that invokes the language processor. However, ClearCase's use of the command line does not include environment variables that the processor may access from the environment. Also, a ClearCase user must perform special actions so that tool versions are included in the dependencies.

ODE-II and imake, like make, use file dates to determine what to rebuild; ClearCase does not. An object is rebuilt when any object it depends upon is different than before.

None of the three systems provides modularity equivalent to Vesta's. They do provide a common file that stores the common rules or definitions in one place that may be referenced from separate makefiles. These rules therefore need not be duplicated in each makefile and a change to the common file will affect all the makefiles that include it. For example, imake supports building for different machines by allowing machine dependencies (such as compiler options, alternate command names, and special make rules) to be kept separate from the descriptions of the objects to be built.

10 Future directions

The Vesta system was in use at SRC for more than one year. During that time several areas were identified for future work. Some of this work, described in Sections 10.1, 10.2, and 10.3, is needed to improve system usability. Other work, described in Sections 10.4, 10.5 and 10.6, is needed to reduce memory usage and increase speed.

10.1 Form models

The Vesta language offers extreme flexibility in writing models. However, as in all languages, flexibility provides the opportunity for both good and bad structure. We'd like to allow proven structures to be written more easily without taking away the "escape hatch" that is necessary to do something unusual.

After writing models for more than a year, we noticed that several basic patterns for model-writing began to emerge. To make it easier to write new models, form models should be developed. Such form models should be quite useful because in a typical model there is no new structure; models of the same type often differ only in the lists of files in the system.

Form models will reduce what a new user must understand about the Vesta language. Right now, most users use the "copy-and-edit" approach to writing models; a user will find a model for a similar library or application, copy the model, and edit the appropriate parts. Form models will codify this procedure so that a user can be certain of using an approved format.

10.2 Vesta language debugger

Users often write models with bugs, and the models are often complex enough that finding the bugs can be difficult. A debugger for Vesta models would help users understand what goes wrong when they write incorrect models.

Most of the features that users want in a Vesta debugger are standard ones provided by general-purpose debuggers. Also, users have requested one nonstandard feature. They want to ask: "Where was this name bound to its current value?". This is important because where names are bound are not always textually apparent in models, since functions can return bindings and names can be generated by bridges.

It is difficult to imagine a similar debugging facility for use with make, because of make's lack of formal semantics. Traces of make's actions are usually all that is available.

10.3 Browsing system builds

The main browsing tools available in software development environments today are mainly language-specific use/ definition tools. Future work for the Vesta system includes a browser that can answer language-independent questions about building sets of models, although it knows nothing about language-specific semantics.

Common queries might include:

Where is identifier XYZ defined/used?

Where is the value V used?

What library supplies the implementation of Foo?

Evaluate expression E in a given scope.

Another area for work would be to integrate language-specific browsers with the Vesta browser.

10.4 Grouping cache entries into caches

Section 7.6 described two problems with the current approach to grouping cache entries into caches: the cache miss rate is too high and the memory usage per server is too great. A solution is briefly sketched here; it uses a cache server.

A cache server is responsible for storing cache entries and for providing a cache lookup function. Cache entries are kept in files on disk. All cache entries for a given primary key are grouped into a single file called a PKFile. PKFiles are read as needed during cache lookup. The cache server maintains an in-core hash table of new cache entries that have not yet been written to disk, or of cache entries that were recently used through a cache hit.

A PKFile file is a hash table. Cache entries are assigned to a bucket based upon the values of the free variables that are common to every cache entry in the file. PKFiles are organized so that the whole file need not be read during a cache lookup. Hash buckets that are read are kept small enough so that performance is not adversely impacted.

With the cache server, all cache entries for a given primary key are available to every evaluation. This eliminates the current problem where an evaluation does not find an applicable cache entry even though one exists in some cache somewhere. Note that although caches are never updated in today's scheme, PKFiles will be updated as new cache entries are generated.

Cache servers will need a lot of memory, but moving this functionality to a server means that client workstations will not incur the high memory usage required by caching today. If necessary, there may be more than one cache server, with each server handling a portion of the cache entries.

10.5 A fine-grained dependency scheme

As described in Section 5.2, the secondary cache key is constructed from the free variables in the function body. This scheme is not ideal when a free variable is a composite value (i.e., a list or binding) or a closure. This section discusses improvements to the current approach.

With a list or binding value, the function may depend only on one component of the list or binding even though the free variable names the entire value. With a fine-grained dependency scheme, the entry on the secondary cache key will change. Recall that the current information is:

<free var name, free var value, is-a-model>

The new secondary cache key entry will be:

<free expression, free expression value, is-a-model>

This allows an entry on the secondary cache key to be a component of a composite value instead of the entire composite value.

To make this fine-grained scheme work, we must be able to determine which composite value each component value belongs to, if any, and what expression selects the component value from the composite value. The evaluator maintains the necessary information during evaluation. The expression is compact, since it is to be stored as the "name" in a secondary cache key; for a binding component, for example, a typical expression will be binding$component1$component2.

As discussed in Section 6.2, a lazy value may be a component of a free variable value. Currently, if the lazy value is not completely unlazied it may later cause unnecessary cache misses, but if the lazy value is completely unlazied that may cause unnecessary evaluation. The fine-grain dependency scheme solves this problem: the only cache key entries are those components that are actually used by the function, which will already be completely simplified.

10.6 Parallel distributed evaluation

Currently a software system is completely built on the workstation which initiated the build. Distributing the building in parallel to a network of machines will decrease the total evaluation time.

There has been a fair amount work in the underpinnings of distributed evaluation, e.g., how to pass evaluation context efficiently between machines. The difficulty in doing distributed building in Vesta is determining when remote evaluation is warranted and how to schedule the remote machines. Practical considerations include expected length of compilation, "warmth" of file system caches on remote machines, and resource availability.

11 Conclusions

This paper introduces Vesta, a novel system for configuration management. It focuses on the modelling language used to describe configurations, and on the evaluator that processes models to build software systems.

A simple functional language is all that is needed to describe large and complex systems. This language can be used to produce exhaustively complete descriptions of real software systems in which all dependencies are explicitly captured. These descriptions contain all the sources and building instructions that go into the result, including the tools and libraries used in building the system.

Models written in the Vesta language are compact, and easy to read and write, for three major reasons. First, the language makes it easy to manipulate large groups of name-value pairs. Second, the language provides a way of defaulting formal parameters at the point of function definition. Third, the language supports defaulting of formal parameters at the point of function invocation.

The language allows for the dynamic integration of existing compilers and tools. Each new tool extends the basic types and primitives provided by the Vesta language. The language makes it easy to add a new tool by providing a single naming mechanism by which a tool can access its inputs.

Given the performance characteristics of model evaluation, a simple interpreter is adequate to evaluate system descriptions. While the interpreter itself can be quite simple, Vesta's complete system descriptions do place heavy demands on persistent caching of function applications. In particular, caching must be performed for function applications at all levels of the dynamic call graph. Caching at the leaves only (which correspond to compilation and linking) would not produce acceptable performance when evaluating complete descriptions. Since cache lookup is used heavily by the evaluator it must be carefully implemented to make evaluation efficient.

Performance measurements show that the run-time performance of Vesta is comparable to that of make. This is in spite of the fact that Vesta offers stronger consistency guarantees for the resulting software system.

12 Language semantics

This is a definition of the core of the Vesta language, by means of an explicit interpreter that maps an expression and an environment into a value.

The following are values in the language:

ERR, NIL, TRUE, and FALSE pairs of values bindings and closures texts, integers, and UIDs bridge values.

The notation for pairs and lists is Lisp-like; that is, (x, y) is short for CONS (x, CONS (y, NIL)).

A binding is a total map from names to values. Bindings map all but a finite number of names to the distinguished value ERR. If b is not a binding, b(N) is defined to be ERR. If b1 and b2 are bindings, define (b1 ELSE b2) to be the binding defined by the rule that for any name N,

```
(b1 ELSE b2)(N) =
IF b1(N) = ERR THEN b2(N) ELSE b1(N) END
```

If either b1 or b2 is not a binding, b1 ELSE b2 is defined to be ERR.

The function Eval takes an expression E and two bindings, called the static and dynamic environments, and produces a value. It is defined by cases; if E is not handled by one of the cases below Eval returns ERR.

For any name N,

Eval(N, s, d)=(s ELSE init ELSE d)(N)

where init is an initial binding whose contents are a parameter to the language definition. The initial bindings contains the predefined values ERR, TRUE, and FALSE, and the built-in functions.

The "$" operator in the language extracts the value associated with a name in a binding. That is:

Eval(E$N, s, d)=Eval(E, s, d) (N)

A comma-separated list surrounded by round parentheses represents a list:

```
Eval ( (E_1, ... , E_n) , s, d) =
  ( Eval (E_1, s, d), ... , Eval(E_n, s, d) )
Eval( () , s, d) = NIL
```

A semicolon-separated list surrounded by curly braces represents a binding formed by evaluating a list of bindings in order, adding each one to the static environment before evaluating the next one, and returning as a result the "ELSE" of all of them. It is convenient to define first the case in which there are just two bindings in the list:

```
Eval ({E; F}, s, d) = f ELSE e
  where e = Eval ({E}, s, d)
  and f = Eval ({F}, e ELSE s, d).
```

Notice that curly braces are placed around e and f in the recursive evaluations, so that if they contain semi-colons, the rule will apply to them again. This gives two ways of evaluating an expression like {E; F; G}, but since they produce the same result it does not matter.

If commas are used instead of semicolons, then each binding is evaluated in the initial environment; that is, the bindings are evaluated "in parallel" instead of sequentially:

```
Eval ({E, F}, s, d) = f ELSE e
  where e = Eval({E}, s, d)
  and f = Eval ({F}, s, d).
```

The comma has higher precedence than the semicolon, so that for example: {E, F; G}is short for {{ E, F}; G}.

An explicit binding is created by listing name-value pairs with an equals sign between the name and the value:

```
Eval({N=E}, s, d)=(FUNCTION x: IF x= N THEN e ELSE ERR
  END) where e=Eval (E, s, d)
```

The "base case" for the rules above is that if "E" does not have the form "F; G", "F, G", or "N=E", then Eval({E}, s, d)=Eval(E, s, d)

Eval({ }, s, d)=NIL

As a consequence, curly braces can be used to override the precedence rules; round parentheses cannot be used for this purpose since (X) is a list of length 1.

The language has a LET construct that is conventional except that the binding is a value:

Eval ( LET B in E, s, d)= Eval(E, Eval(B, s, d) ELSE s, d)

The language has an IF construct that is conventional:

```
Eval (IF T THEN E ELSE F, s, d) =
  IF Eval(T, s, d) = TRUE THEN Eval(E, s, d)
  ELSEIF Eval(T, s, d) = FALSE THEN Eval(F, s, d)
  ELSE ERR END
```

The DIRECTORY expression is unique to the Vesta language. It is the top-level expression in a model, and is used to introduce specific versions of the source files that compose the software system:

```
Eval(DIRECTORY D1 IMPORT D2 IN E, s, d) =
  Eval(E, Eval({D1}, s, d) ELSE Eval({D2}, s, d) ELSE s, d)
```

A UID is a unique repository identifier which names another model or a source file. A UID is evaluated differently depending upon whether it is a model or a regular source file:

```
Eval(UID, s, d) =
  IF IsModel(UID) THEN Eval(Parse(Read(UID)), NIL, NIL)
  ELSE Read(UID) END
```

The functions Read and IsModel are abstractions of the facilities provided by the Vesta repository. Read returns the text associated with the UID supplied as its parameter.

IsModel is a predicate that is true if and only if its parameter names a Vesta model. Parse takes a text as a parameter and returns an expression; it returns ERR if its parameter can not be parsed into a legal expression.

A closure is a quadruple (formals, body, environment, type) where formals is a list of names, body is an expression, environment is a binding, and type is either STATIC or DYNAMIC.

There are two forms for constructing closures, one of which leads to type=STATIC and one of which leads to type=DYNAMIC. The syntactic distinction is that for the latter case, the list of formals is followed by a literal "...". Note that "..." is literally part of the Vesta language, and not an ellipsis in this description.

```
Eval(FUNCTION formals IN E, s, d) =
    (formals, E, s', STATIC)
Eval(FUNCTION formals ... IN E, s, d) =
    (formals, E, s', DYNAMIC)
``` where s' is s restricted to the set of variables that occur free in E but not in formals; this set fs is defined by induction over the structure of E:

```
fs (N)                  = N
fs (E$N)                = fs (E)
fs ((E1, ..., En))      = Ui fs (Ei)
fs ({E;F})              = fs (E) U fs (F)
fs ({E,F})              = fs (E) U fs (F)
fs ({N=E})              = fs (E)
fs ({E})                = fs (E)
fs (LET B IN E)         = fs (B) U fs (E)
fs (IF T THEN E ELSE F) = fs (T) U fs (E) U fs (F)
fs (FUNCTION F ... IN E) = fs (E)
fs (FUNCTION F ... IN E) = fs (E)
fs (F A)                = fs(F) U fs(A)
```

Finally there is application, which is denoted by juxtaposition. There are two cases, corresponding to the application of a static or dynamic closure, which differ only in the way they set the dynamic environment for the evaluation of the body of the closure:

Eval(F A, s, d)=Eval(body, s', d')

where Eval(F, s, d)=(formals, body, env, STATIC),
actuals=Eval (A, s, d) ,
s'= BindArgs(actuals, formals, s, d) ELSE env,
d'= { }

Eval(F A, s, d)=Eval(body, s', d')

where Eval(F, s, d)=(formals, body, env, DYNAMIC),
actuals=Eval(A, s, d),
s'= BindArgs(actuals, formals, s, d) ELSE env,
d'= (s ELSE d)

The function BindArgs(a, f, s, d) returns a binding of the actuals a to the formals f. Any unbound formals are bound from the environment. The actual may be a binding, list, or other value:

BindArgs(a, f, s, d)= BindArgs(NIL, f, a ELSE s, d) where a is a binding.

```
BindArgs(NIL, NIL, s, d) = { }
BindArgs(CONS(a, a1), CONS(f, f1), s, d) =
    {f=a, BindArgs (a1, f1, s, d) }
BindArgs(NIL, CONS(f, f1), s, d) =
    {(s ELSE d) (f), BindArgs(NIL, f1, s, d)}
```

BindArgs(a, f, s, d)=BindArgs(CONS (a, NIL), f, s, d) where a is neither a binding nor a list.

What is claimed is:

1. In a computer system for processing a computer program, said computer program including a plurality of functions including a plurality of variables, a method for defining said variables comprising the steps of:

A) storing in a static scope a first plurality of variable names corresponding to a first plurality of said variables and a plurality of first values associated with said first plurality of variable names;

B) storing a dynamic scope a second plurality of variable names corresponding to a second plurality of said variables and a plurality of second values associated with said second plurality of said variable names;

C) binding at least one of said first and second values to each said variable during evaluation of said functions, said binding step including, with respect to each said variable, the steps of i) searching for the variable name corresponding to said variable in said static scope and, if found, binding to said variable the one of said first values associated with said corresponding variable name in said static scope; and ii) if said corresponding variable name is not found in said static scope, searching for said corresponding variable name in said dynamic scope and, if found, binding to said variable the one of said second values associated with said variable name in said dynamic scope, whereby said static scope takes precedence over said dynamic scope in evaluating said functions.

2. The method in accordance with claim 1, further comprising the steps of:

A) associating each said variable name of said first plurality of said variable names with at least one of said first values as of a point in said computer program whereat the function including the variable corresponding to said variable name is defined; and B) associating each said variable name of said second plurality of said variable names with at least one of said second values associated therewith as of a point in said computer program whereat the function including the variable corresponding to said variable name is applied.

3. The method in accordance with claim 1, wherein the first value associated with said variable name when found in said static scope is bound to said corresponding variable by replacing said corresponding variable during processing of at least one of said functions with said associated first value, and wherein the second value associated with said variable name when found in said dynamic scope is bound to said corresponding variable by replacing said corresponding variable during processing of at least one of said functions with said associated second value.

4. The method in accordance with claim 1, further comprising the step of updating said static scope and said dynamic scope when said first and second values are bound to said variables and when, during processing of said computer program, said variable names are assigned new values.

5. A method of operating a computer system comprising the steps of:

A) processing a computer program in a processor, during which a plurality of program values are assigned to a plurality of program variables for evaluating a plurality of functions included in said program;

B) storing a plurality of name/value pairs in a memory, each name/value pair comprising a variable name and an associated value, said storing step including the steps of i) storing a first set of said name/value pairs in a static scope, said name/value pairs of said first set including values for the associated variable names that are defined when, during processing of said program, a first set of said functions is defined, said first set of said functions including a first plurality of said program variables that correspond to said variable names of said first set of name/value pairs; and ii) storing a second set of said name/value pairs in a dynamic scope, said name/value pairs of said second set including values for the associated variable names that are defined when, during processing of said program, a second set of said functions is applied, said second set of said functions including a second plurality of said program variables that correspond to said variable names of said second set of name/value pairs; and C) said processing step including, for each program variable, the steps of (i) checking whether a corresponding name/value pair is stored in said static scope means, and (ii) if corresponding name/value pair is not stored in said static scope, both retrieving a value of one of said name/value pairs corresponding to said program variable from said dynamic scope, and binding said retrieved value as said program value to said program variable.

6. The method in accordance with claim 5, wherein said processing step further includes the steps of causing said assigned values and corresponding variable names associated with said program variables to be stored in said memory as corresponding name/value pairs, and using said variable names to retrieve said corresponding values from said stored name/value pairs for use as program values during processing of said program.

7. The method in accordance with claim 5, wherein said binding step comprises the steps of replacing said program variable with said retrieved value in evaluating said function, and updating said static and dynamic scope means to reflect said evaluation.

8. The method in accordance with claim 5, further comprising the step of updating said static scope means and said dynamic scope means when each of said retrieved values are bound to said program variables and when, during processing of said computer program, said program variables are assigned new values.

9. The method in accordance with claim 5, wherein said first set of functions includes functions of said second set.

10. A computer system comprising:

A) processing means for processing a computer program, during which a plurality of program values are assigned to a plurality of program variables for evaluating a plurality of functions included in said program;

B) a memory for storing a plurality of name/value pairs, each comprising a variable name and an associated value, said memory including i) static scope means for storing a first set of said name/value pairs for which the values for the associated variable names are defined when, during processing of said program by said processing means, a first set of said functions is defined, said first set of said functions including a first plurality of said program variables that correspond to said variable names of said first set of name/value pairs; and ii) dynamic scope means for storing a second set of said name/value pairs for which the values for the associated variable names are defined when, during processing of said program by said processing means, a second set of said functions is applied, said second set of said functions including a second plurality of said program variables that correspond to said variable names of said second set of name/value pairs; and C) during said processing, for each program variable, said processing means checks whether a corresponding name/value pair is stored in said static scope means, and if said static scope means does not store a corresponding name/value pair, said processing means both retrieves a value of one of said name/value pairs corresponding to said program variable from said dynamic scope, and binds said retrieved value as said program value to said program variable.

11. The computer system in accordance with claim 10, wherein said processing means comprises an evaluator.

12. The computer system in accordance with claim 11, wherein said evaluator binds said retrieved value to said program variable by replacing said program variable with said retrieved value in evaluating said function, and updating said static and dynamic scope means to reflect said evaluation.

13. The computer system in accordance with claim 10, wherein, if said static scope means stores a corresponding name/value pair, said processing means both retrieves a value of one of said name/value pairs corresponding to said program variable from said static scope, and binds said retrieved value as said program value to said program variable.

14. The computer system in accordance with claim 13, wherein said processing means updates said static scope means and said dynamic scope means when each of said retrieved values are bound to said program variables and when, during processing of said computer program, said program variables are assigned new values.

15. The computer system in accordance with claim 10, wherein said processing means looks up a variable name associated with each said program variable in said static scope means, and, if a corresponding name/value pair is not found in said static scope means for any of said program variables, looks up the variable names for said any program variables in said dynamic scope means.

16. The computer system in accordance with claim 10, wherein said first set of functions includes functions of said second set.

* * * * *